(12) United States Patent
Karaki

(10) Patent No.: US 8,175,171 B2
(45) Date of Patent: May 8, 2012

(54) TRANSMITTER, RECEIVER, TRANSMITTING METHOD, RECEIVING METHOD, VARIABLE-LENGTH SERIAL BURST DATA TRANSFER SYSTEM, SEMICONDUCTOR DEVICE AND HYBRID SEMICONDUCTOR DEVICE

(75) Inventor: Nobuo Karaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1042 days.

(21) Appl. No.: 12/113,688

(22) Filed: May 1, 2008

(65) Prior Publication Data

US 2008/0285678 A1    Nov. 20, 2008

(30) Foreign Application Priority Data

May 8, 2007    (JP) ................... 2007-123357

(51) Int. Cl.
*H04B 3/00* (2006.01)
*H04L 25/00* (2006.01)
(52) U.S. Cl. ......... 375/257; 375/259; 375/295; 375/316
(58) Field of Classification Search .................. 375/257, 375/259, 295, 316, 340
See application file for complete search history.

(56) References Cited

U.S. PATENT DOCUMENTS

| 5,199,107 | A | | 3/1993 | Ozawa | |
| 6,085,261 | A | * | 7/2000 | McIntyre et al. | 710/35 |
| 7,282,946 | B2 | * | 10/2007 | Har et al. | 326/21 |
| 2005/0041606 | A1 | * | 2/2005 | Hori et al. | 370/299 |
| 2008/0181315 | A1 | * | 7/2008 | Wang et al. | 375/257 |

OTHER PUBLICATIONS

Design Wave Magazine, pp. 16-17, Jul. 2005.
Jun. 15, 2011 Office Action issued in U.S. Appl. No. 12/113,632.
Jul. 8, 2011 Office Action issued in U.S. Appl. No. 12/113,632.
U.S. Appl. No. 12/113,632, filed May 1, 2008.

* cited by examiner

*Primary Examiner* — David B. Lugo
(74) *Attorney, Agent, or Firm* — Oliff & Berridge, PLC

(57) ABSTRACT

A transmitter for use in a variable-length serial burst data transmission system having the transmitter and a receiver that are connected by at least two data signal lines and a burst start line includes a dual-rail encoder and a burst start signal receiving part. While transmitting variable-length serial data, the dual-rail encoder encodes each bit of the serial data into a corresponding symbol, inserts a null symbol delimiting the data symbols, and sends out the symbols via the two data signal lines to the receiver. For a period of non-transmission state, the transmitter sends out an invalid symbol representing a non-transmission state via the two data signal lines to the receiver. The burst start signal receiving part receives a burst start signal, which indicates a start of burst transmission of the variable-length serial data, via the burst start line from the receiver. In the transmitter, the dual-rail encoder sends out the null symbol to the receiver at the start of the burst transmission, and performs the burst serial transmission of the variable-length serial data in response to the burst start signal sent out by the receiver.

19 Claims, 10 Drawing Sheets

|  |  | "Invalid" | "1" | "0" | "Null" |
|---|---|---|---|---|---|
| DATA SIGNAL LINES | d1 | 1 | 1 | 0 | 0 |
|  | d0 | 1 | 0 | 1 | 0 |

TRANSMITTER, RECEIVER, TRANSMITTING METHOD, RECEIVING METHOD, VARIABLE-LENGTH SERIAL BURST DATA TRANSFER SYSTEM, SEMICONDUCTOR DEVICE AND HYBRID SEMICONDUCTOR DEVICE

The entire disclosure of Japanese Patent Application No. 2007-123357, filed on May 8, 2007 is expressly incorporated by reference herein.

BACKGROUND OF THE INVENTION

1. Technical Field

The present invention relates to an asynchronous data transmission. More particularly, the invention relates to a communication system for implementing a signaling method that performs a variable-length serial burst data transmission at a high bit rate by using either two-phase or four-phase handshaking.

2. Related Art

A data transmission between asynchronous systems is performed by means of either two-phase or four-phase handshaking.

Such a technique is disclosed in "Case studies on asynchronous processors", subtitled "A radical countermeasure against noise and power related problems clinging to digital LSIs", written by Nobuo Karaki, edited in pp. 64-91, Design Wave Magazine, July, 2005.

However, in case of transmitting serial data, either two-phase or four-phase handshaking disclosed in the above article has such a problem that overhead time of bit-by-bit handshaking leads to a long transmission time.

Accordingly, in other words, there is another problem that high-bit-rate serial data transmission cannot be achieved by the conventional asynchronous data transmission methods using either two-phase or four-phase handshaking.

SUMMARY

An advantage of the present invention is to provide a communication system that allows high-bit-rate serial data transmission by an asynchronous data transmission method using either two-phase or four-phase handshaking.

The transmitter according to the first aspect of the invention is a transmitter of a variable-length serial burst data transmission system, where the transmitter and a receiver are connected by at least two data signal lines and a burst start signal line.

The transmitter includes a dual-rail encoder and a burst start signal receiving part.

While transmitting variable-length serial data, the dual-rail encoder encodes each bit of the serial data into a corresponding symbol, inserts a null symbol delimiting the data symbols, and sends out the symbols via the two data signal lines to the receiver.

For a period of non-transmission state, the transmitter sends out an invalid symbol representing a non-transmission state via the two data signal lines to the receiver.

The burst start signal receiving part receives a burst start signal, which indicates a start of burst transmission of the variable-length serial data, via the burst start line from the receiver.

The dual-rail encoder sends out a null symbol to the receiver at the start of the burst transmission, and performs the burst transmission of the variable-length serial data in response to the burst start signal from the receiver received by the burst request signal receiving part.

According to the first aspect of the invention, such effects are obtained that the overhead time of bit-by-bit handshaking in asynchronous communication between the transmitter and the receiver, which is commenced by a request from the transmitter, can be suppressed, and that the transmission system can be robust against the environmental variations and low-power at a high bit-rate while taking advantage from the nature of asynchronous communication.

A transmitter according to a second aspect of the invention is a transmitter of a variable-length serial burst data transmission system consisting of the transmitter and a receiver that are connected by at least two data signal lines and a burst request signal line.

The transmitter includes a burst request signal receiving part that receives a burst request signal via the burst request signal line from the receiver, and a dual-rail encoder.

The burst request signal is a signal indicating a request for burst transmission of variable-length serial data.

When the burst request signal is received by the burst request signal receiving part, the dual-rail encoder encodes each bit of the serial data into a corresponding symbol, inserts a null symbol delimiting the symbols, and sends out the symbols via the two data signal lines to the receiver.

For a period of non-transmission state, the dual-rail encoder sends out an invalid symbol representing the non-transmission state via the two data signal lines to the receiver.

According to the second aspect of the invention, such effects are obtained that overhead caused in bit-by-bit handshaking of the conventional asynchronous communication between the transmitter and the receiver can be suppressed, and that the transmission system can be robust against the variations in temperature and operating voltage, and can be low-power at a high bit-rate, while taking advantage from the nature of asynchronous communication.

A receiver according to a third aspect of the invention is a receiver of a variable-length serial burst data transmission system consisting of a transmitter and the receiver that are connected by at least two data signal lines and a burst start signal line.

The receiver includes a storage, a dual-rail decoder, a data invalid signal generator, a burst start signal generator and a burst start signal transmitting part.

The storage stores data received from the transmitter, and outputs a data empty signal while the storage is vacant of data.

The dual-rail decoder receives and decodes a series of symbols of variable-length serial data received from the transmitter into binary data.

While receiving the variable-length serial data, it is supposed that the transmitter encodes each bit of the serial data into a corresponding symbol, inserts a null symbol delimiting the data symbols, and sends out the symbols via the two data signal lines to the receiver. For a period of non-transmission state, the transmitter sends out an invalid symbol representing a non-transmission state via the two data signal lines to the receiver.

The dual-rail decoder is such a decoder that outputs a null symbol signal when a null symbol is decoded, and outputs an invalid symbol signal when an invalid symbol representing the non-transmission state is decoded, and decodes a data symbol into binary data, which is stored into the storage.

The invalid symbol signal and the null symbol signal are input from the dual-rail decoder to the data invalid signal generator, and the data invalid signal generator generates a data invalid signal for the period from receipt of the invalid symbol signal to receipt of the null symbol signal.

The data invalid signal is active, indicating that the received data is not to be stored into the storage, for the period from receipt of the invalid symbol signal to receipt of the null symbol signal.

The data invalid signal and the data empty signal are input to the burst start signal generator, and the burst start signal generator generates a burst start signal only when both the data invalid signal and the data empty signal are input.

The burst start signal is a signal indicating a start of burst transmission of variable-length serial data.

The burst start signal transmitting part sends out to the transmitter the burst start signal generated by the burst start signal generator.

A receiver according to a fourth aspect of the invention is a receiver of a variable-length serial burst data transmission system consisting of a transmitter and the receiver that are connected by at least two data signal lines and a burst request line.

The receiver includes a storage memory, a burst request signal transmitting part, a dual-rail decoder, a data invalid signal generator and a burst end signal generator.

The storage stores data received from the transmitter, and outputs a data empty signal while the storage is vacant of data.

The burst request signal transmitting part transmits a burst request signal via the burst request line to the transmitter.

The burst request signal is a signal that indicates a request for burst transmission of variable-length serial data.

The dual-rail decoder decodes a series of symbols, which is encoded from variable-length serial data and is sent by the transmitter, which commences the transmission in response of the burst request signal.

While transmitting the variable-length serial data, the transmitter encodes each bit of the serial data into a corresponding symbol, inserts a null symbol delimiting the data symbols, and sends out the symbols via the two data signal lines to the receiver. For a period of non-transmission state, the transmitter sends out an invalid symbol representing a non-transmission state via the two data signal lines to the receiver.

The dual-rail decoder is such a decoder that outputs a null symbol signal when a null symbol is decoded, outputs an invalid symbol signal when a invalid symbol representing the non-transmission state is decoded, and decodes a data symbol into binary data, which is stored in the storage.

The invalid symbol signal and the null symbol signal are both input from the dual-rail decoder to the data invalid signal generator, and the data invalid signal generator generates a data invalid signal for the period from receipt of the invalid symbol signal to receipt of the null symbol signal.

The data invalid signal is active, indicating that the received data is not stored to the storage, for the period from receipt of the invalid symbol signal to receipt of the null symbol signal.

The data invalid signal and the data empty signal are both input to a burst end signal generator, and the burst end signal generator generates and outputs a burst end signal when the data invalid signal and the data empty signal are both input.

The burst end signal indicates the end of receiving the variable-length serial data.

In the receiver according to the third aspect of the invention, the dual-rail decoder may be a decoder that decodes the received symbols, outputs the decoded data to the storage and generates a write signal, which is active for an appropriate time for the storage to safely capture the received data.

The receiver may be a receiver that includes a strobe signal generator that generates and outputs a strobe signal to the storage in acknowledgement of the write signal from the dual-rail decoder.

The strobe signal generator may be a strobe signal generator that holds back from outputting a strobe signal, when a data invalid signal is input from the data invalid signal generator.

According to this aspect of the invention, such effects are obtained that the receiver can safely capture the data even with hazards on the data line.

According to the third aspect of the invention, the receiver may include a dual-rail decoder decoding a series of the received symbols into binary serial data, and a serial-to-parallel converter converting the binary serial data to parallel data of a predetermined number of bits, which is stored in the storage of the predetermined number of bits.

According to this aspect of the invention, such effects are obtained that serial data received by the receiver can be stored as parallel data.

A transmitting method according to a fifth aspect of the invention is a transmitting method whereby a variable-length serial burst data transmission system has the transmitter and a receiver both connected by at least two data signal lines and a burst start signal line.

According to the transmitting method of the invention, the transmitter performs transmission of variable-length serial data by encoding each bit of the serial data into a corresponding symbol delimited by a null symbol, and sending out the symbols via the two data signal lines to the receiver, and sending out an invalid symbol representing a non-transmission state via the two data signal lines to the receiver for an interval period between transmission states; sending out the null symbol to the receiver at the start of the burst transmission, and receiving a burst start signal, which indicate that the receiver has decoded the first null symbol sent and got ready to receive a series of symbols of the variable-length serial data, via the burst start signal line from the receiver; and commencing the burst transmission of the variable-length serial data in response to the burst start signal from the receiver received by the burst start signal receiving part.

A transmitting method according to a sixth aspect of the invention is a transmitting method, whereby a variable-length serial burst data transmission system has the transmitter and a receiver both connected by at least two data signal lines and a burst request signal line.

According to the transmitting method of the invention, the transmitter performs transmission of variable-length serial data by receiving a burst request signal, which indicates a request for burst transmission of variable-length serial data, via the burst request signal line from the receiver; and sending out the first null symbol to commence the burst transmission of the variable-length serial data in response to the burst request signal received by the burst request signal receiving part, encoding each bit of the serial data into a corresponding symbol delimited by a null symbol, and sending out the symbols via the two data signal lines to the receiver, and sending out an invalid symbol representing a period of non-transmission state via the two data signal lines to the receiver for an interval period between transmission states.

A receiving method according to a seventh aspect of the invention is a receiving method whereby a variable-length serial burst data transmission system has a transmitter and the receiver both connected by at least two data signal lines and a burst start signal line.

According to the receiving method of the invention, the receiver performs receipt of variable-length serial burst data by receiving a series of symbols delimited by a null symbol from the transmitter via two data signal lines, outputting an invalid symbol signal in response of an invalid symbol received from the transmitter for an interval period of transmission state, wherein the transmitter sends out an invalid symbol representing a non-transmission state via the two data signal lines, decoding a series of the symbols received into binary serial data, storing the binary data to a storage; outputting a data empty signal while the storage is vacant of data; generating a data invalid signal for a period from receipt of the invalid symbol signal to receipt of the null symbol signal, where the data invalid signal indicates that the received data is not to be stored to the storage; generating a burst start signal only when both the data invalid signal and the data empty signal are input; and sending out the burst start signal to the transmitter.

A receiving method according to an eighth aspect of the invention is a receiving method, whereby a variable-length serial burst data transmission system has a transmitter and the receiver both connected by at least two data signal lines and a burst request signal line.

According to the receiving method of the invention, the receiver performs receipt of variable-length serial burst data by firstly sending out a burst request signal via the burst request signal line to the transmitter; receiving a series of symbols of variable-length serial data sent out by the transmitter in response of the burst request signal; receiving an invalid symbol representing a non-transmission state via the two data signal lines from the transmitter during an interval period of non-transmission state; decoding the null symbol delimiting the symbols of variable-length serial data and outputting the null symbol signal; outputting invalid symbol signal when an invalid symbol representing the non-transmission state is decoded; decoding a series of symbols of variable-length serial data and storing the decoded binary data into a storage; outputting a data empty signal when the storage is vacant of data; generating a data invalid signal for a period from receipt of the invalid symbol signal to receipt of the null symbol signal, where the data invalid signal indicates that the received data is not to be stored to the storage; and outputting a burst end signal, which indicates the end of receiving the variable-length serial data and is sent to the transmitter, while the data invalid signal and the data empty signal are both input.

In the receiving method according to the seventh aspect of the invention, the receiver decodes and outputs the received data to a storage; outputs a write signal to the storage for an appropriate time while the received data is output to the storage to make the received data be safely stored into the storage; and masks the write signal to make the received data not be stored while the data invalid signal is active.

In the receiving method according to the seventh aspect of the invention, the receiver converts the received data from a serial to a parallel of a predetermined number of bits and makes the parallel data be stored into the storage.

A variable-length serial burst data transmission system according to a ninth aspect of the invention includes a transmitter and a receiver that are connected by at least two data transmission lines and a burst start line.

The transmitter includes a dual-rail encoder and a burst start signal receiving part.

While transmitting variable-length serial data, the dual-rail encoder encodes each bit of the serial data into a corresponding symbol, inserts a null symbol delimiting the data symbols, and sends out the symbols via the two data signal lines to the receiver. For a period of non-transmission state, the transmitter sends out an invalid symbol representing a non-transmission state via the two data signal lines to the receiver.

The burst start signal receiving part receives a burst start signal, which indicates a start of burst transmission of the variable-length serial data, via the burst start line from the receiver.

The dual-rail encoder sends out a null symbol to the receiver at the start of the burst transmission, and performs the burst transmission of the variable-length serial data in response to the burst start signal from the receiver received by the burst request signal receiving part.

The receiver includes a storage, a dual-rail decoder, a data invalid signal generator, a burst start signal generator and a burst start signal transmitting part.

The storage stores data received from the transmitter and outputs a data empty signal while the storage is vacant of data.

The dual-rail decoder decodes a series of symbols of variable-length serial data from the transmitter into binary data; outputs an null symbol signal when the null symbol is decoded; and outputs a invalid symbol signal when an invalid symbol delimiting the symbols is decoded; and makes the binary data be stored into the storage.

The invalid symbol signal and the null symbol signal are both input from the dual-rail decoder to the data invalid signal generator, and the data invalid signal generator generates a data invalid signal, which is active indicating that the received data is not to be stored into the storage for the period from receipt of the invalid symbol signal to receipt of the null symbol signal.

The data invalid signal and the data empty signal are input to the burst start signal generator, and the burst start signal generator generates a burst start signal only when the data invalid signal and the data empty signal are both input.

The burst start signal transmitting part transmits to the transmitter the burst start signal generated by the burst start signal generator.

A variable-length serial burst data transmission system according to a tenth aspect of the invention includes a transmitter and a receiver that are connected by at least two data transmission lines and a burst request line.

The receiver includes a burst request signal transmitting part that transmits a burst request signal via the burst request line to the transmitter. The burst request signal is a signal that represents a request for burst transmission of variable-length serial data.

The transmitter includes a burst request signal receiving part and a dual-rail encoder.

The burst request signal receiving part receives the burst request signal via the burst request line from the receiver.

When the burst request signal is received by the burst request signal receiving part, the dual-rail encoder starts to encode each bit of the serial data into a corresponding symbol, inserts a null symbol delimiting the symbols, and sends out the symbols via the two data signal lines to the receiver. For a period of non-transmission state, the dual-rail encoder sends out an invalid symbol representing the non-transmission state via the two data signal lines to the receiver. The receiver includes a storage, a dual-rail decoder, a data invalid signal generator and a burst end signal generator.

The storage stores data received from the transmitter, and outputs a data empty signal while the storage is vacant of data.

The dual-rail decoder receives and decodes a series of symbols of variable-length serial data received from the transmitter into binary data; outputs an null symbol signal when a null symbol is decoded; outputs a invalid symbol signal when an invalid symbol is decoded; decodes a series of data symbols into binary data; and stores the decoded binary data in the storage.

The invalid symbol signal and the null symbol signal are input from the dual-rail decoder to the data invalid signal generator, and the data invalid signal generator generates a data invalid signal indicating that the received data is not to be stored into the storage, for the period from receipt of the invalid symbol signal to receipt of the null symbol signal.

The data invalid signal and the data empty signal are both input to the burst end signal generator, and the burst end signal generator generates and outputs a burst end signal when the data invalid signal and the data empty signal are both input. The burst end signal indicates the end of receiving the variable-length serial transmit data.

In the variable-length serial burst data transmission system according to the ninth aspect of the invention the data transmission lines may be made of metal conducting electricity.

In the variable-length serial burst data transmission system according to the ninth aspect of the invention, the data transmission lines may be made of optical fiber; the dual-rail encoder may include a plurality of light emitters that output signals representing pairing bits of symbols delimited by a null symbol via a plurality of optical fibers; the symbol, includes a null symbol and an invalid symbol; and the dual-rail decoder may include a optical receiver that receives the symbols via the optical fibers.

According to this aspect of the invention, such effects are obtained that the high-bit-rate serial data transmission system can stably perform communication with less electromagnetic interference from the environment.

In the variable-length serial burst data transmission system according to this aspect of the invention, the light emitter may modulate the optical output at a high frequency in accordance with the data symbol; and the light receiver may receive and demodulate the high-frequency light in accordance with the symbol. According to this invention, such an effect is obtained that a single optical cable can conduct the symbol encoded in the dual-rail encoding scheme.

According to an eleventh aspect of the invention, the variable-length serial burst data transmission system according to the ninth aspect of the invention can be formed on a single silicon substrate.

According to this aspect of the invention, such an effect is obtained that a circuit of the semiconductor device formed on a single silicon substrate can perform communication by using the high-bit-rate serial data transmission system according to the ninth aspect of the invention.

A hybrid semiconductor device according to a twelfth aspect of the invention can have the variable-length serial burst data transmission system according to the ninth aspect of the invention formed on a plurality of silicon substrates.

According to this aspect of the invention, such an effect is obtained that the circuit in a single semiconductor device consisting of a plurality of silicon substrates can perform communication by using the high-bit-rate serial data transmission system.

BRIEF DESCRIPTION OF THE DRAWINGS

The invention is briefly described by using the drawings.

DESCRIPTION OF EXEMPLARY EMBODIMENTS

First Embodiment

A Combination of an Active Transmitter and a Passive Receiver

Embodiments of the invention are described in detail below with references to the drawings.

Figure 1:
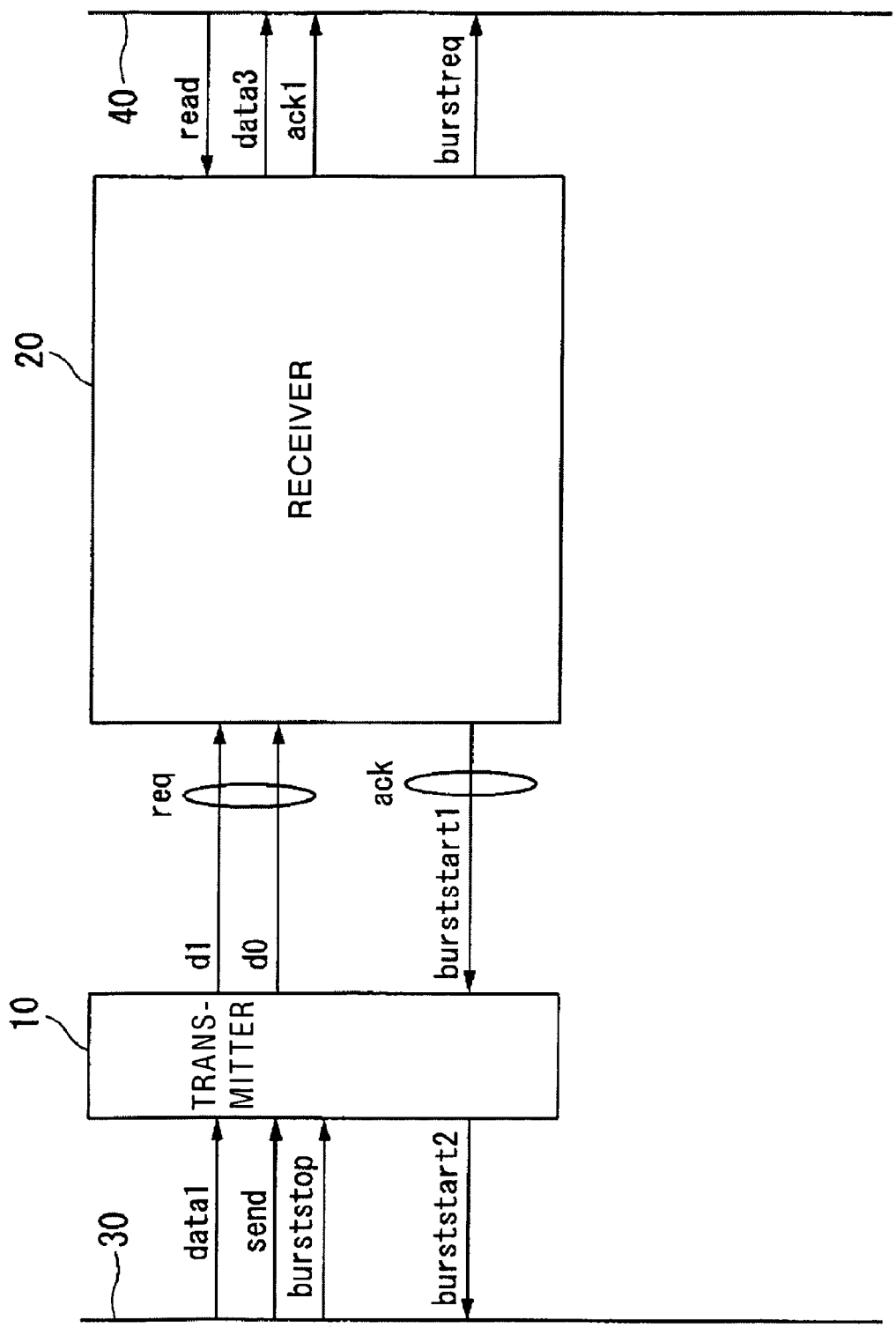
FIG. 1 is a schematic block diagram showing the configuration of the high-bit-rate serial data transmission system according the first embodiment of the invention.

FIG. 1 is a schematic block diagram showing the configuration of a high-bit-rate serial data transmission system (variable-length serial burst data transmission system) according to the first embodiment of this invention.

The high-bit-rate serial data transmission system according to this first embodiment is of a combination of an active transmitter and a passive receiver.

The terms "an active transmitter and a passive receiver" refer to a communication system in which a transmitter actively starts the communication by firstly sending out a request to the receiver, which starts to receive by outputting the start signal in response to the request. In this invention, the request is the first null symbol after the last invalid symbol.

This high-bit-rate serial data transmission system is consists of a high-bit-rate serial data transmitter 10 and a high-bit-rate serial data receiver 20.

The high-bit-rate serial data transmitter 10 and the high-bit-rate serial data receiver 20 are connected by two data transmission lines "d0" and "d1".

The high-bit-rate serial data transmitter 10 and the high-bit-rate serial data receiver 20 are connected also by a burst start signal line named "burststart1".

Hereinafter, the "high-bit-rate serial data transmitter 10" is referred to as the "transmitter 10", and the "high-bit-rate serial data receiver 20" as the "receiver 20", for simple descriptions.

Each of the data transmission line "d0" and the data transmission line "d1" can be a metal line, for example.

The burst start signal line "burststart1" can also be a metal line.

The input signals: the transmission data named "data1", the transmission control signal named "send", and the burst stop signal named "burststop" are inputted to the transmitter 10 via the transmitter control bus 30, and the output signal: the burst start signal named "burststart2" is outputted by the transmitter 10 via the transmitter control bus 30.

The input signal: the read signal named "read" is inputted to the receiver 20 via the receiver control bus 40, and the outputs: the transmission data named "data3", the read acknowledgement signal named "ack1", and a burst request signal named "burstreq" are outputted by the receiver 20 via the receiver control bus 40.

Connected to the transmitter control bus 30 is such a bus master as a central processing unit (CPU) and a dedicated hardwired logic that is in charge of controlling the transmitter 10, which sends the transmission data to the receiver 20.

Connected to the receiver control bus 40 is such a bus master as a CPU and a dedicated hardwired logic that is in charge of controlling the receiver 20, which receives the transmission data from the transmitter 10.

Dual-Rail Encoding

Encoding scheme on the two data lines: d0 and d1, which connect the transmitter 10 and the receiver 20, is described below.

Each bit of the serial data is encoded into a corresponding symbol, which consists of two bits and is sent out via the data signal lines: "d0" and "d1". The signal on the data signal lines swings in voltage between a high level and a low level of binary logic.

Hereinafter, "high level" is represented by a value "H" or "1", as well as "low level" by a value "L" or "0".

Symbols: "Invalid", "1", "0", and "Null" are represented by the two data lines: d0 and d1, as shown in FIG. 2.

Figures 2, 3:
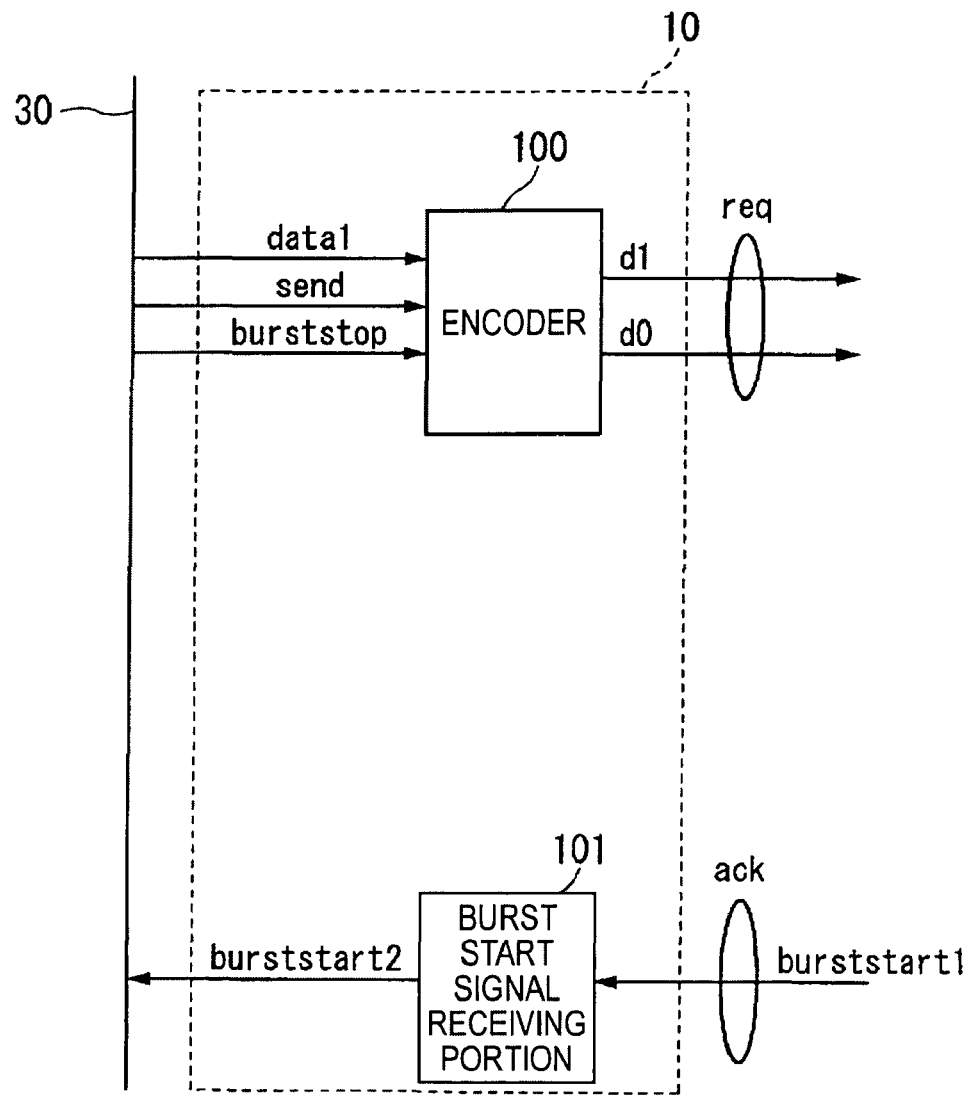
FIG. 2 is a truth table of the dual-rail encoding scheme adopted by the transmitter and the receiver of the high-bit-rate serial data transmission system.
FIG. 3 is a schematic block diagram showing the configuration of a transmitter according to the first embodiment.

Here in FIG. 2, a combination of value {1,1} of the data line {d0,d1} represents a symbol "Invalid".

A combination of value {0,0} of the data line {d0,d1} represents a symbol "Null".

A combination of value {1,0} of the data line {d0,d1} represents a symbol "0".

A combination of value {0,1} of the data line {d0,d1} represents a symbol "1".

The symbol "0" and the symbol "1" represent each bit of binary serial data; the symbol "0" corresponds to value "0" of a bit of the data, and the symbol "1" corresponds to value "1" of a bit of the data.

Hereinafter, a symbol "0" is represented by a "symbol 0", and a symbol "1" as a "symbol 1", and also a symbol 0 and a symbol 1 are represented by a "transmission data symbol".

Further, a symbol "Invalid" is represented by a "symbol I", and a symbol "Null" as a "symbol N."

Hereinafter, the encoding scheme described above is referred to as "dual-rail encoding".

In the dual-rail encoding, each value of the serial data: 0 and 1 is encoded into respectively symbol 0 and symbol 1.

Further, a symbol N is automatically placed in front of either symbol 0 or symbol 1 by the encoder.

Symbol N placed in front of each symbol 0 and symbol 1 leads to a symbol N automatically inserted between the symbols: 0 and 1.

Symbol N inserted between the symbols can act as a delimiter, whereby the boundary of symbols of 0 and 1 can be easily detected.

Configuration of Transmitter 10

With reference to FIG. 3, the configuration of the transmitter 10 is described in detail below.

In the figure, parts corresponding to parts in FIG. 1 are indexed by using the same numbers, and the description thereof is left out.

The transmitter 10 includes an encoder 100 and a burst start signal receiving part 101.

The encoder 100 starts encoding for the burst transmission when the burst stop signal on "burststop" connected to the transmitter control bus 30 is negated or turns to L.

After the start of burst transmission, the send control signal on "send" and the transmission data on "data1" connected to the transmitter control bus 30 are input to the encoder 100.

The encoder 100 encodes the input on "data1", and sends out the output to the receiver 20 via the data signal lines: "d0" and "d1" only when the transmitter control signal on "send" is active or H.

While the input on "burststop" is H and the input on "send" is L, the encoder 100 outputs a symbol I.

While the input on "burststop" is L and the input on "send" is L, the encoder 100 outputs a symbol N.

While the input on "burststop" is L and the input on "send" is H, the encoder 100 encodes the input on "data1" and outputs a symbol corresponding to the input, that is a symbol 1 for 1 and a symbol 0 for 0 on "data1".

Namely, during a period of transmitting variable-length serial data, the encoder 100 encodes each bit of the data on "data1" into a symbol (symbol 0 or symbol 1) delimited by a null symbol (symbols N), and then sends out the output to the receiver via the two data signal lines.

For a period of non-transmission state, the transmitter sends out an invalid symbol (symbol I) representing a non-transmission state via the two data signal lines to the receiver.

The burst start signal receiving part 101 receives the input signal on "burststart1" from the receiver 20 and transfers to the transmitter control bus 30 via the output signal line "burststart2". The system controller can know the burst transmission takes place when the signal on "burststart2" is H.

Configuration of Receiver 20

Figure 4:
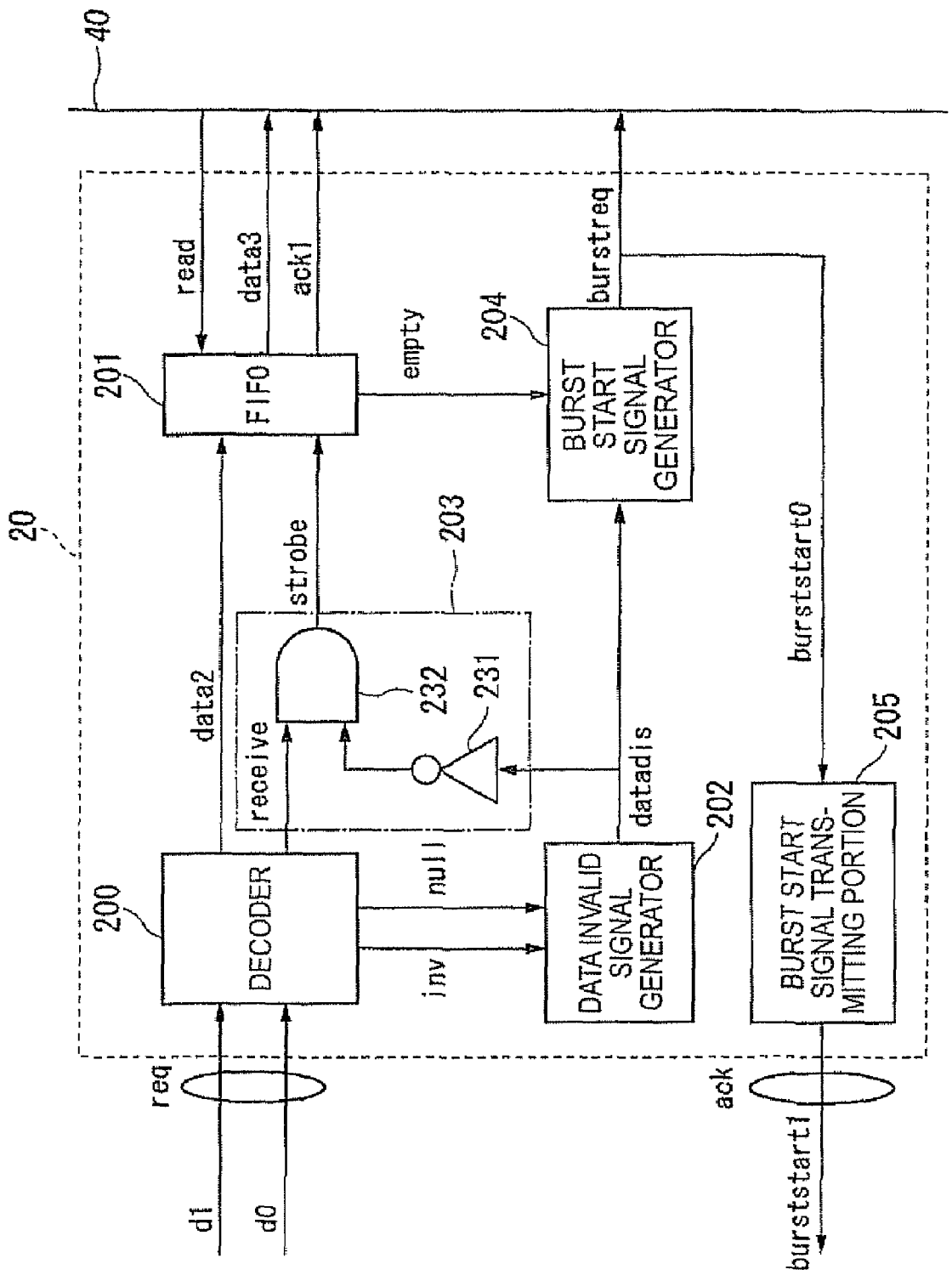
FIG. 4 is a schematic block diagram showing the configuration of the receiver according to the first embodiment.

With reference to FIG. 4, the configuration of the receiver 20 is described in detail below.

In the figure, parts corresponding to parts in FIG. 1 are indexed by using the same numbers, and the description thereof is left out.

The receiver 20 consists of a decoder 200, a first-in-first-out (FIFO) buffer memory 201, a data invalid signal generator 202, a strobe signal generator 203, a burst start signal generator 204 and a burst start signal transmitting part 205.

The decoder 200 decodes a symbol sent from the transmitter 10, which encodes data into the symbol by using the dual-rail encoding scheme, via the data signal line "d0" and "d1", and outputs the data decoded from the symbol onto "data2", which connects to the FIFO 201. Data on "data2" is 1 or H for symbol "1", as well as 0 or L for symbol "0".

The data receive signal on "receive" is driven to H by the decoder 200 only when the decoder 200 outputs the decoded data onto "data2", and otherwise is driven to L, while the decoder receives either symbol I or symbol H. The data receive signal on "receive" is outputted to the strobe signal generator 203.

The decoder 200 can generate the data receive signal on "receive" simply by using an exclusive-or logic (EXOR) circuit having two input terminals, each of which is connected to the data transmission line "d0" and "d1", respectively.

The symbol I signal on "inv" is driven to H by the decoder 200 only when the decoder 200 receives a symbol I from the transmitter 10 via the data lines "d0" and "d1", and otherwise is driven to L.

The symbol I signal onto "inv" is outputted to the data invalid signal generator 202.

The decoder 200 generates the symbol I signal on "inv" simply by using an and logic (AND) circuit having two input terminals, each of which is connected to the data transmission line "d0" and "d1", respectively.

The symbol N signal on "null" is driven to H by the decoder 200 only when the decoder 200 receives a symbol N from the transmitter 10 via the data signal lines "d0" and "d1", and otherwise is driven to L.

The symbol N signal "null" is outputted to the data invalid signal generator 202.

The decoder 200 generates the symbol N signal on "null" simply by using a not-or logic (NOR) circuit having two input terminals, each of which is connected to the data transmission line "d0" and "d1", respectively.

The symbol I signal on "inv" and the symbol N signal on "null" are both fed by the decoder 200 to the data invalid signal generator 202, which drives the data invalid signal on "datadis" to H (true) for a period of time from receipt of the symbol I signal on "inv" to receipt of the null symbol signal on "null".

The data invalid signal generator 202 outputs the data invalid signal on "datadis" to the strobe signal generator 203 and the burst start signal generator 204.

The input to the strobe signal generator 203 are the data invalid signal on "datadis" from the data invalid signal generator 202 and the data receive signal on "receive" from the decoder 200.

Only when the input data invalid signal on "datadis" is L (false) and the input data receive signal on "receive" is H (True), the strobe signal on "strobe" is outputted to the FIFO 201.

The strobe signal generator 203 can consist of a not logic (NOT) circuit 231 and an and logic (AND) circuit 232.

The input to the NOT circuit 231 is a data invalid signal on "datadis" from the data invalid signal generator 202.

The data invalid signal on "datadis" is inversed by the NOT circuit 231 to gate the data receive signal on "receive" by the AND circuit 232.

The data receive signal on "receive" is fed by the decoder 200 to the AND circuit 232.

The strobe signal on "strobe" outputted by the AND circuit 232 is fed to the FIFO 201.

The received data on "data2" outputted by the decoder 200 can be stored into the FIFO 201 when the strobe signal on "strobe" is active or H.

The FIFO 201 can store the received data on "data2" from the decoder 200 when the strobe signal on "strobe" is swung from L to H.

The FIFO 201 outputs the stored data to the receiver control bus via "data3" in response of the read signal on "read" from the receiver control bus 40, and then outputs the read acknowledgement signal on "ack1" to acknowledge the read signal on "read".

The FIFO 201 outputs the data empty signal on "empty" to the burst start signal generator 204 when no data is stored.

The data invalid signal on "datadis" from the data invalid signal generator 202 and the data empty signal on "empty" from the FIFO 201 are both fed to the burst start signal generator 204.

When the input data invalid signal on "datadis" is H (true) and the input data empty signal on "empty" is H (true), the burst start signal generator 204 swings the burst start signal on "burststart0" to H (True), which is fed to the burst start signal transmitting part 205.

The burst start signal on "burststart0" is fed to the receiver control bus 40 as the burst request signal via "burstreq".

The burst start signal transmitting part 205 swings the input burst start signal to H on "burststart1" connecting to the transmitter 10 when the burst start signal on "burststart0" is active or H.

Operations of Transmitter 10 and Receiver 20

By using FIG. 5, the operations of the transmitter 10 and the receiver 20 are described in detail below.

In this case for example, the transmitter 10 performs burst transmission of just two bits of data: 0 and 1.

Hereinafter, the points of time illustrated in the figures are indexed in ascending order so that, if $i<j$, $t_i<t_j$, where i and j are integers and $t_i$ stands for a point of time indexed by i.

Before the burst transmission takes place, as shown around $t_{100}$, the encoder 100 of the transmitter 10 holds a symbol I on the two data signal lines: d0 and d1 connecting to the receiver 20.

At $t_{101}$, the burst stop signal on "burststop" from the transmitter control bus 30 is swung to L to make the encoder 100 of the transmitter 10 ready to start encoding.

At $t_{102}$, a single bit data 0 is placed via the transmitting bus 30 on "data1" as the first value to transmit.

When the burst stop signal on "burststop" is swung to L at $t_{101}$, the encoder 100 of the transmitter 10 sends out a symbol N via the two data signal lines: d0 and d1 to the receiver 20 at $t_{103}$.

The symbol I is represented by is on both d0 and d1 while the symbol N is represented by 0s on both d0 and d1.

Accordingly, it theoretically can be expected that d0 and d1 simultaneously swing from 1 to 0.

However, the signal transitions on the data signal lines can vary in time because of variations in wire length and characteristics of switching devices.

Therefore, there practically can be a hazard during a period of the transition time from symbol I to symbol N.

Given that the signal on d1 changes from H to L at $t_{101}$ and the signal on d0 changes from H to L at $t_{103}$, the signals {1,0} on d0 and d1 represent a symbol 0 for a period of time from $t_{101}$ to $t_{103}$.

This symbol 0 for the period of time from $t_{101}$ to $t_{103}$ is exactly a hazard.

So far, it shall be reasonably supposed that data appearing on the data signal lines: d0 and d1 is undetermined and then either a symbol 0 or the symbol 1 appears during the period of time from $t_{101}$ to $t_{103}$.

At $t_{101}$, the decoder 200 of the receiver 20 that has received a symbol 0 instead of a symbol I swings the symbol N signal on "inv" from H to L, swings the data receive signal on "receive" from L to H, and outputs data 0 to "data2".

The strobe signal on "strobe" generated by the strobe signal generator 203 of the receiver 20 outputs remains at L (false) for a period of time from $t_{101}$ to $t_{103}$, even though the data receive signal on "receive" generated by the decoder 200 of the receiver 20 changes from L to H, because the data invalid signal on "datadis" generated by the data invalid signal generator 202 of the receiver 20 remains at H.

Therefore, data on "data2" is not written into the FIFO 201 of the receiver 20.

Namely, a hazard, which can be either a symbol 1 or a symbol 0 between a symbol I and a symbol N, caused by the transition of signals on d0 and d1 can be masked by the data invalid signal on "datadis".

At $t_{103}$, when a symbol N arrives from the transmitter, the decoder 200 of the receiver 20 swings the symbol N signal on "null" from L to H, and the data receive signals on "receive" from H to L.

In response to the swing of the symbol N signal on "null" from L to H, the data invalid signal generator 202 of the receiver 20 swings the data invalid signal on "datadis" from H to L.

In response to the swing of the data invalid signal on "datadis" from H to L by the data invalid signal generator 202 of the receiver 20, the burst start signal generator 204 of the receiver 20 swings the burst start signal on "burststart1" from H to L, and outputs the burst request signal on "burstreq" to the receiver control bus 40.

In response to the burst start signal on "burststart1" from the receiver 20, the burst start signal receiving part 101 of the transmitter 10 takes an active-low signal on "burststart1" as a burst start signal, which is also understood as a acknowledgement to the request for the burst transmission by firstly sending out the data on the data lines: d0 and d1 as shown in FIG. 3, and outputs the burst start signal on "burststart2" to the transmitter control bus 30.

In response to the burst start signal, the transmitting bus master connected to the transmitter control bus 30 starts the burst transmission.

At $t_{104}$, the send control signal on "send", which is inputted to the encoder 100 of the transmitter 10, is swung from L to H by the transmitting bus master connecting to the transmitter control bus 30.

The encoder 100 of the transmitter 10 sends out the symbol 0 to the data signal lines: d0 and d1, which are connect to the receiver 20, in response to the send control signal on "send" swung at $t_{104}$.

In some time from $t_{104}$, the symbol 0 sent by the transmitter reaches the decoder 200 of the receiver 20.

The decoder 200 of the receiver 20 drives "data2" to L or 0 when the symbol 0 is decoded, then swings the symbol N signal on "null" from H to L and the data receive signal on "receive" from L to H.

Since the data invalid signal on "datadis" has been swung to L by the data invalid signal generator 202 of the receiver 20, the strobe signal generator 203 is allowed to generate the strobe signal on "strobe". Namely, the strobe signal on "strobe" is swung from L to H when the data receive signal on "receive" is swung from L to H.

The strobe signal on "strobe" driven to H makes the FIFO 201 capture the data 0 outputted by the decoder onto "data2", and the data empty signal on "empty" is swung to L.

At $t_{105}$, when the send control signal on "send" is swung to L by the transmitting bus master on the transmission control bus 30, the encoder 100 of the transmitter 10 sends out a symbol N to the receiver 20.

When the symbol N reaches the decoder 200 of the receiver 20, the decoder 200 decodes the symbol N and swings the symbol N signal on "null" to H, and the data receive signal on "receive" to L.

At $t_{106}$, the transmitting bus master on the transmission control bus 30 firstly puts 1 on "data1", and secondly, at $t_{107}$, swings the send control signal on "send" to H.

Acknowledging the send control signal on "send" swung to H, the encoder 100 of the transmitter 10 encodes 1 on "data1" and sends out a symbol 1 to the receiver 20.

When the data on the data signal lines: d0 and d1 reaches the decoder 200 of the receiver 20, the decoder decodes the data and outputs the receive signal on "receive". Since the data invalid signal on "datadis" has been lowered by the data invalid signal generator 202 in some time from $t_{103}$, a strobe signal on "strobe" is generated by the strobe signal generator 203 when the receive signal on "receive" is outputted. The strobe signal on "strobe" makes the FIFO 201 capture 1 on "data2".

The transmitting bus master on the transmission control bus 30 swings the burst stop signal on "burststop" to H around $t_{101}$ to tell the encoder 100 that the send control signal sent out on "send" is the last one for the burst transmission of two bits of data.

At $t_{108}$, the transmitting bus master on the transmission control bus 30 swings the send control signal on "send" to L.

In response to the send control signal negated or swung to L, the encoder 100 of the transmitter 10 outputs a symbol I to the receiver 20, because the burst stop signal on "burststop" has been driven to H.

The decoder 200 of the receiver 20 receives the symbol I.

In response to the symbol I, the decoder 200 of the receiver 20 swings the symbol I signal on "inv" to H, and the data receive signal on "receive" to L.

In response to the burst request signal on "burstreq" outputted by the burst start signal generator 204 of the receiver 20 to the receiver control bus 40 at $t_{103}$, the data stored in the FIFO 201 of the receiver 20 are promptly read one by one in the order of arrival by the receiving bus master connected to the receiver control bus 40.

Figure 5:
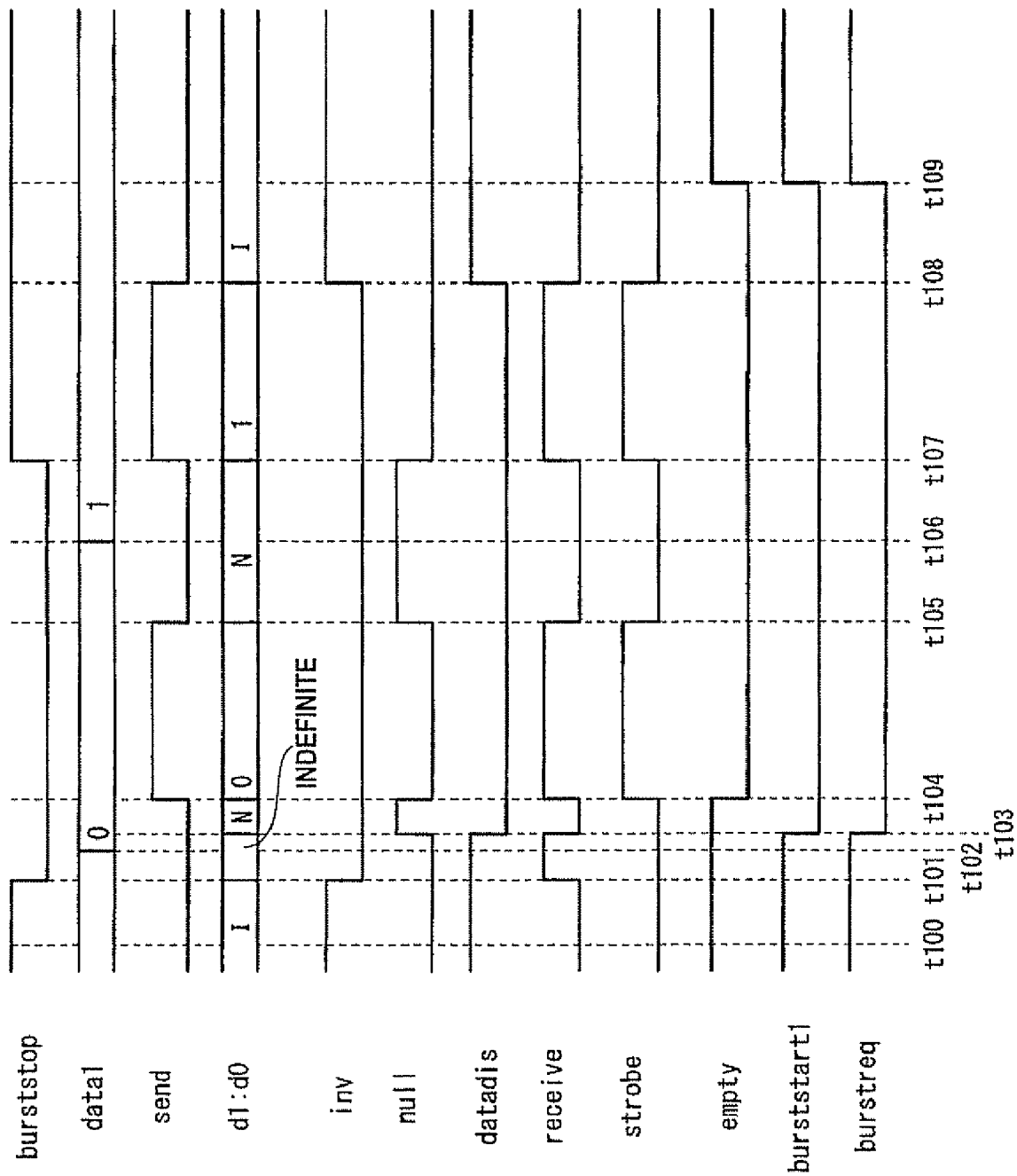
FIG. 5 is a timing chart showing operations of the high-bit-rate serial data transmission system according to the first embodiment.

In FIG. 5, it is given that all the data stored in the FIFO 201 of the receiver 20 has been read by the receiving bus master by $t_{109}$.

At t109, the FIFO 201 of the receiver 20 swings the data empty signal on "empty" to H.

In response to the data empty signal on "empty" swung to H by the FIFO 201 of the receiver 20, the burst start signal generator 204 of the receiver 20 swings the burst start signal on "burststart1" connecting to the transmitter 10 to H, and the burst request signal on "burstreq" connecting to the receiver control bus 40 to H.

The transmitter 10 and the transmitting bus master are informed by the burst start signal swung to H on "burststart1" that all the data transmitted by the transmitter of the burst transmission system has been received by the receiver 20.

The receiving bus master is informed by the burst request signal swung to H on "burstreq" that all the data received from the transmitter of the burst transmission system has been read through the FIFO 201 by the receiving bus master.

Note that the first symbol N right after the last symbol I triggers the burst transmission between the transmitter 10 and the receiver 20.

In response to receipt of the symbol N, the burst start signal on "burststart1" is sent out by the burst start signal generator 204 through the burst signal transmitting part 205, and the transmitter 10 and the transmitting bus master on the transmitter control bus 30 take the burst start signal on "burststat1" received by the burst start signal receiving part 101 as an acknowledgement of the request for the variable-length serial data transmission.

Second Embodiment

Serial-to-Parallel Conversion Added to First Embodiment

Next, referring to FIG. 6, the configuration of a receiver 21 of a high-bit-rate serial data transmission system according to the second embodiment of the invention is described in detail below.

In the figure, parts corresponding to parts in FIG. 4 are indexed by using the same numbers, and the description thereof is left out.

In the high-bit-rate serial data transmission system according to the first embodiment, the receiver 20 stores serial data and serially outputs the stored serial data to the receiver control bus 40.

It is different from the high-bit-rate serial data transmission system according to the first embodiment that the high-bit-rate serial data transmission system according to the second embodiment has a means of parallel data handling by the receiver 21 in stead of the receiver 20 of the first embodiment: storing parallel data, and outputting the stored parallel data to the receiver control bus 40.

Figure 6:
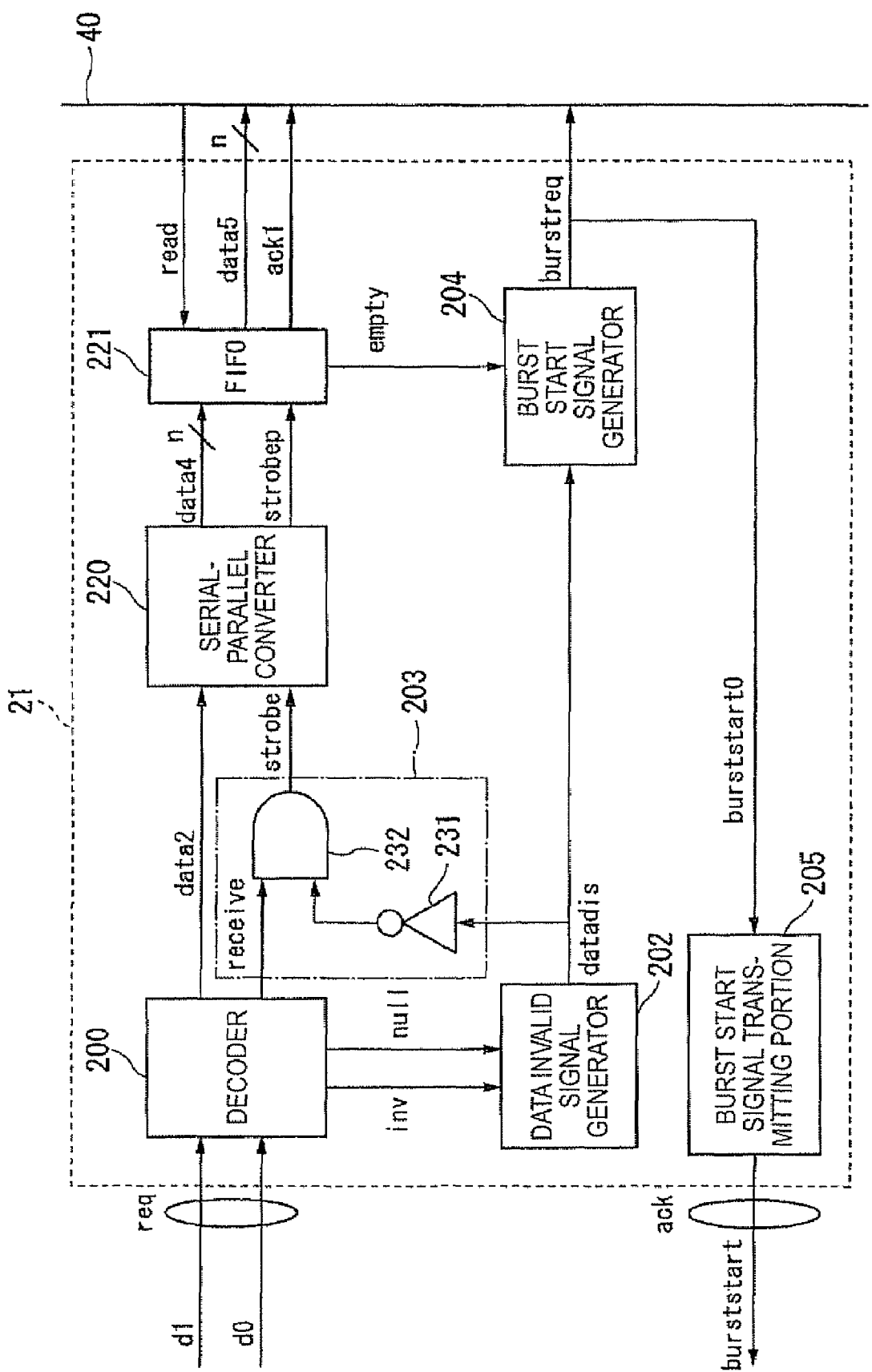
FIG. 6 is a schematic block diagram showing the configuration of the receiver according to a second embodiment.

In the receiver 21 according to the second embodiment shown in FIG. 6, the FIFO 201 of the receiver 20 according to the first embodiment in FIG. 4 is replaced with the FIFO 221.

The FIFO 201 of the first embodiment stores and outputs 1-bit data in the first-in-first-out order.

On the other hand, the FIFO 221 of the second embodiment stores and outputs plural-bit parallel data in the first-in-first-out order.

Note that the single data line "data3" connecting to the FIFO 201 in the first embodiment is replaced with the parallel data lines "data5" connecting to the FIFO 221.

"Data5" is a set of n-bit parallel data lines while data3 is a single data line in FIG. 6.

In the receiver 21 according to the second embodiment in FIG. 6, a serial-to-parallel converter 220 is added between the decoder 200 and the FIFO 221.

The serial-to-parallel converter 220 converts the serial data on "data2", which is outputted by the decoder 200, into a n-bit parallel data, and outputs the parallel data to data4.

For example, the input signals to the serial-to-parallel converter 220 are the serial data on "data2" from the decoder 200 and the strobe signal on "strobe" from the strobe signal generator 203.

In response to the input of the strobe signal on "strobe", the serial-to-parallel converter 220 converts the serial data on "data2" input into the parallel data of a given-number of bits, and outputs the parallel data onto "data4" connecting to the FIFO 221.

The serial-to-parallel converter 220 outputs the strobe signal via "strobep" to the FIFO 221 every n strobe signals on "strobe".

The parallel data data4 and the strobe signal strobep are input from the serial-to-parallel converter 220 to the FIFO 221.

The FIFO 221 captures the data on "data4" by using the strobe signal on "strobep".

In response to the read signal fed via the receiver control bus 40, the FIFO 201 outputs the n-bit parallel data via "data5" to the receiver control bus 40.

The other components and their operations in the second embodiment are the same as those in the first embodiment, and the description thereof is left out.

As described above, in comparison with the high-bit-rate serial data transmission system according to the first embodiment, it is peculiar to the second embodiment that the received data can be stored by using the n-bit serial-to-parallel converter 220 and the n-bit parallel FIFO 221.

In the high-bit-rate serial data transmission system according to the second embodiment, the data stored in the n-bit parallel FIFO 221 is outputted via the receiver control bus 40 to the receiving bus master.

Third Embodiment

Passive Send-Active Receive

Figure 7:
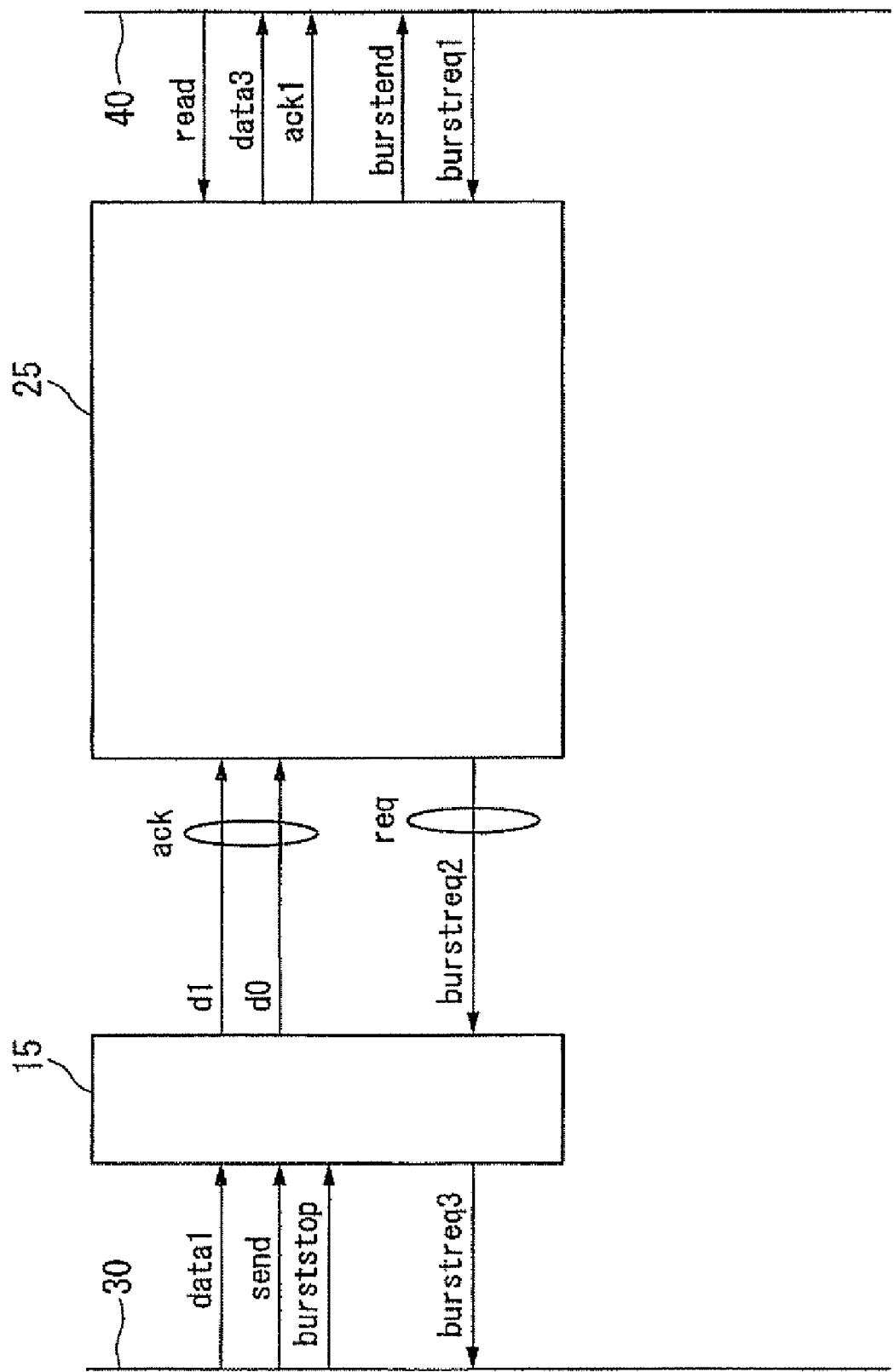
FIG. 7 is a schematic block diagram showing the configuration of the high-bit-rate serial data transmission system according to the third embodiment of the invention.

FIG. 7 is a schematic block diagram showing the configuration of a high-bit-rate serial data transmission system according to the third embodiment of this invention.

While the first embodiment is a high-bit-rate serial data transmission system in a case of active send-passive receive, the high-bit-rate serial data transmission system according to the third embodiment is of a combination of a passive transmitter and an active receiver.

In the figure, parts corresponding to parts in FIG. 1 are indexed by using the same numbers, and the description thereof is left out.

While the transmitter 10 and the receiver 20 in FIG. 1 are connected by the burst start signal line named "burststart1", the transmitter 15 and the receiver 25 in FIG. 7 are connected by a burst request signal line named "burstreq2".

While the burst start signal line named "burststart1" connects the transmitter 10 and the transmitting bus 30 in FIG. 1, a burst request signal line named "burstreq3" connects the transmitter 15 and the transmitting bus 30 in FIG. 7.

While the burst request signal line named "burstreq" connects the receiver 20 and the receiving bus 40 in FIG. 1, a burst end signal line named "burstend" connects the receiver 25 and the receiving bus 40 in FIG. 7.

Further, a burst request signal line named "burstreq1" connects the receiver 25 and the receiving bus 40 in FIG. 7.

In the high-bit-rate serial data transmission system according to the first embodiment shown in FIG. 1, the transmitter 10 sends out a request signal, dubbed "req" in the figure, by outputting the first symbol N onto the data signal lines: d0 and d1 connecting to the receiver 20, and in response to the request signal, the receiver 20 sends out the acknowledgment signal, dubbed "ack", by swinging the burst start signal on "burststart1" to H.

Namely, in the first embodiment, the transmitter 10 actively starts the communication for the burst serial transmission.

On the other hand, in the high-bit-rate serial data transmission system according to the third embodiment shown in FIG. 7, the receiver 25 first sends out the burst request signal to the transmitter 15 by swinging the burst request signal on "burstreq2" to H in response to the burst request signal on "burstreq1" from the receiver control bus 40.

Then, the transmitter 15 sends out an acknowledgement signal dubbed "ack" in the figure via the data signal lines: d0 and d1 to the receiver 25, in response to the burst request signal, which is dubbed "req" in the figure, swung to H on the burst request signal named "burstreq2".

Note that the acknowledgement signal "ack" is the first symbol N right after the last symbol I transmitted via the data signal lines: d0 and d1.

As described above, in the high-bit-rate serial data transmission system according to the third embodiment, the receiver 25 actively starts the communication for the burst serial transmission.

Figure 8:
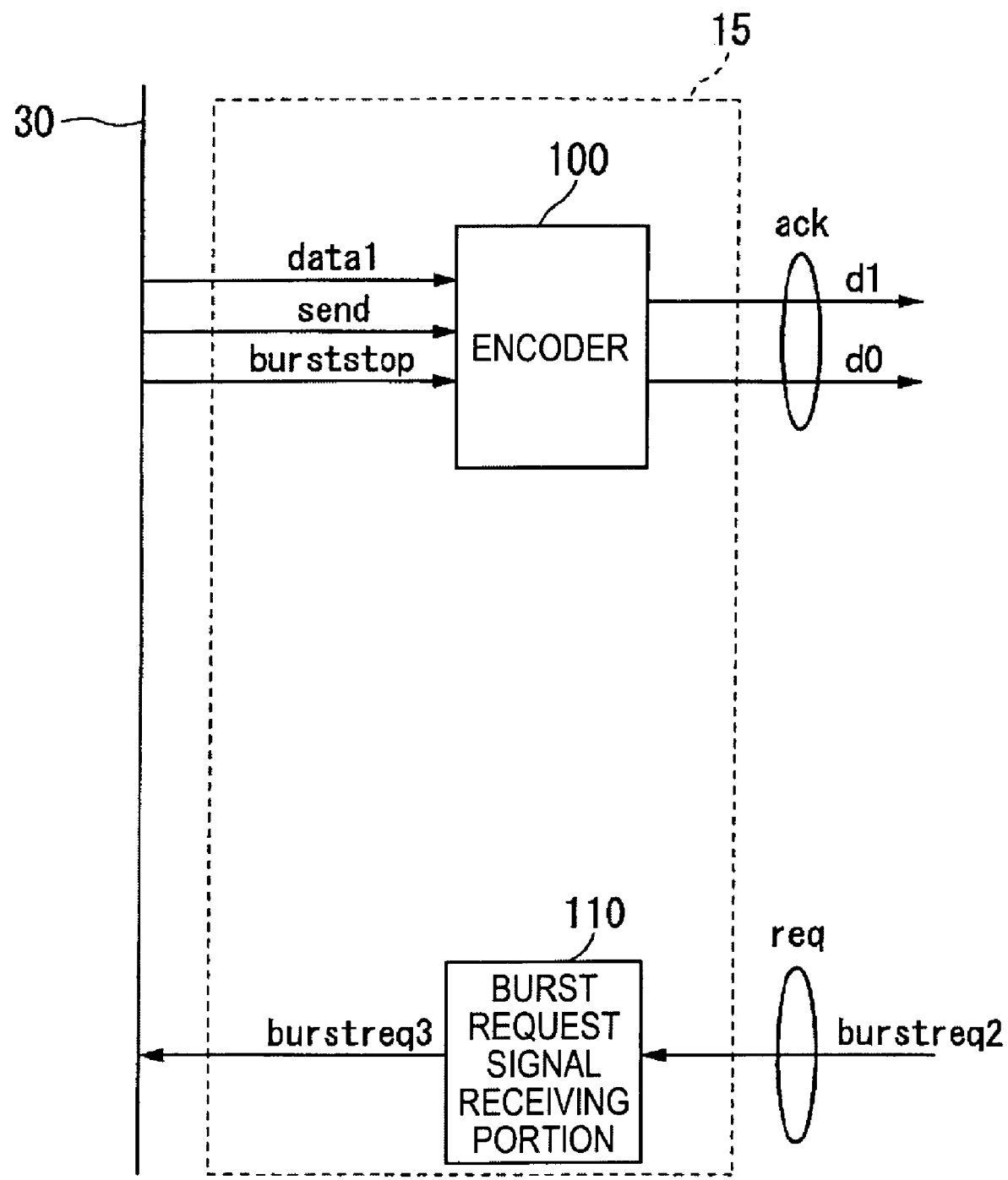
FIG. 8 is a schematic block diagram showing the configuration of the transmitter according to the third embodiment.

Referring to FIG. 8, the configuration of the transmitter 15 is described in detail below. In the figure, parts corresponding to parts in FIGS. 7 and 3 are indexed by the same numbers, and the description thereof is left out.

In FIG. 8, the burst start signal receiving part 101 in FIG. 3 is replaced by a burst request signal receiving part 110.

The burst request signal receiving part 110 receives the burst request signal swung to H on "burstreq2" connecting to the receiver 25.

The burst request signal receiving part 110 sends out the burst request signal onto "burstreq3" connecting to the transmitting bus 30.

The transmitting bus master on the transmitter control bus 30 receives the burst request signal on "burstreq3" via the transmitter control bus 30, and starts the burst transmission in response to the request.

Figure 9:
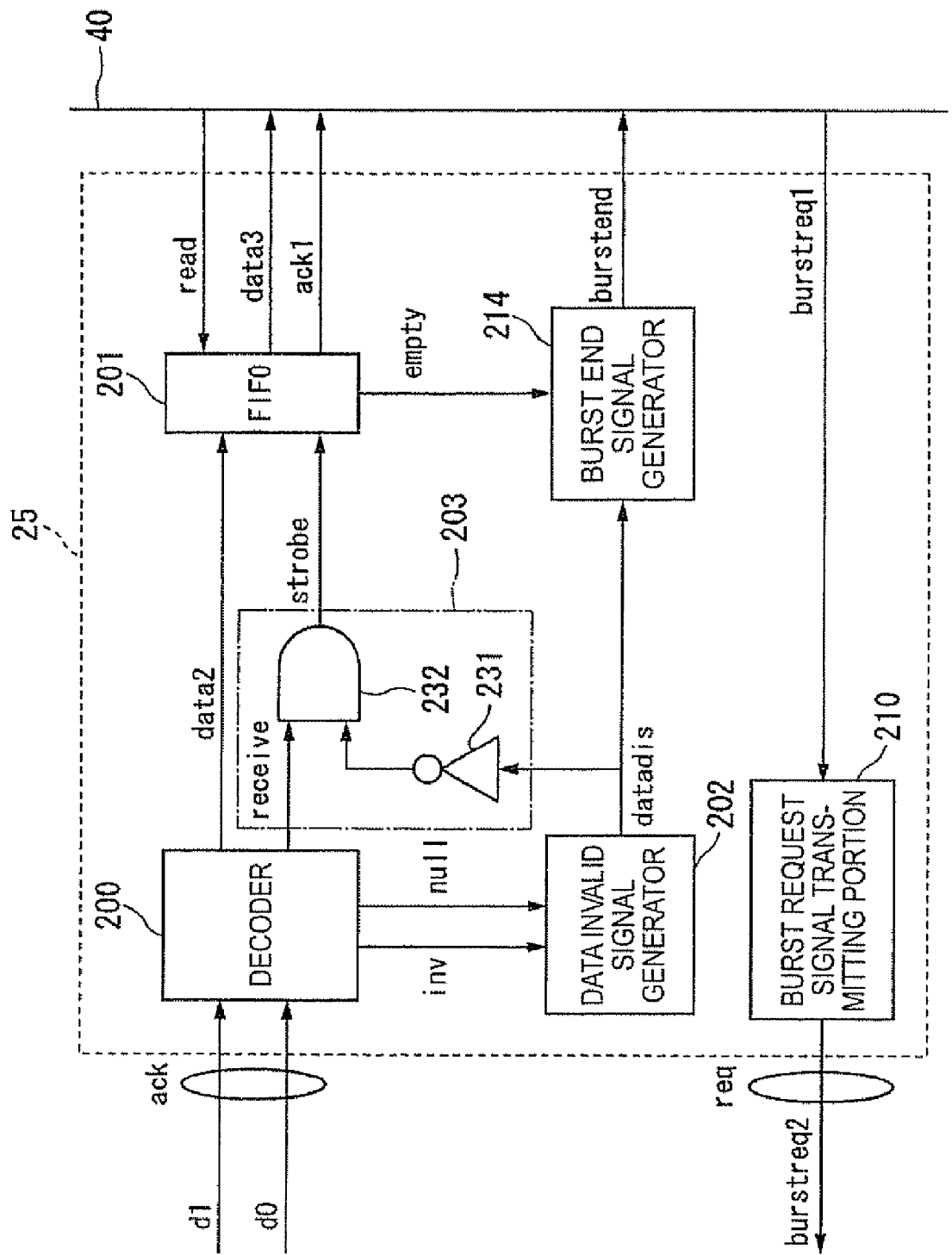
FIG. 9 is a schematic block diagram showing the configuration of the receiver according to the third embodiment.

Referring to FIG. 9, the configuration of the receiver 25 is described in detail below. In the figure, parts corresponding to parts in FIGS. 7 and 4 are indexed by the same numbers, and the description thereof is left out.

A burst end signal generator 214 of FIG. 9 generates the burst end signal on "burstend" in the same way as the burst start signal generator 204 in FIG. 4 sends out the burst request signal on "burstreq" connecting to the receiving bus 40.

The other components and operations of the burst end signal generator 214 in FIG. 9 are the same as those of the burst start signal generator 204 in FIG. 4, and therefore the description thereof is left out.

The burst request signal transmitting part 210 in FIG. 9 sends out the burst request signal on "burstreq2" connecting to the transmitter 10 in response to the burst request signal on "burstreq1" received from the receiver control bus 40, in the same way as the burst start signal transmitting part 205 in FIG. 4 sends out the burst start signal on "burststart0" connecting to the transmitter 10 in response to the burst start signal on "burststart1" received from the receiver control bus 40.

The other components and operations of the burst request signal transmitting part 210 in FIG. 9 are the same as those of the burst start signal transmitting part 205 in FIG. 4, and therefore the description thereof is left out.

However, while the burst start signal on "burststart0" in FIG. 4 is generated by the burst start signal generator 204 in FIG. 4, the burst request signal on "burstreq1" in FIG. 9 is generated by the receiving bus master on the receiver control bus 40.

Figure 10:
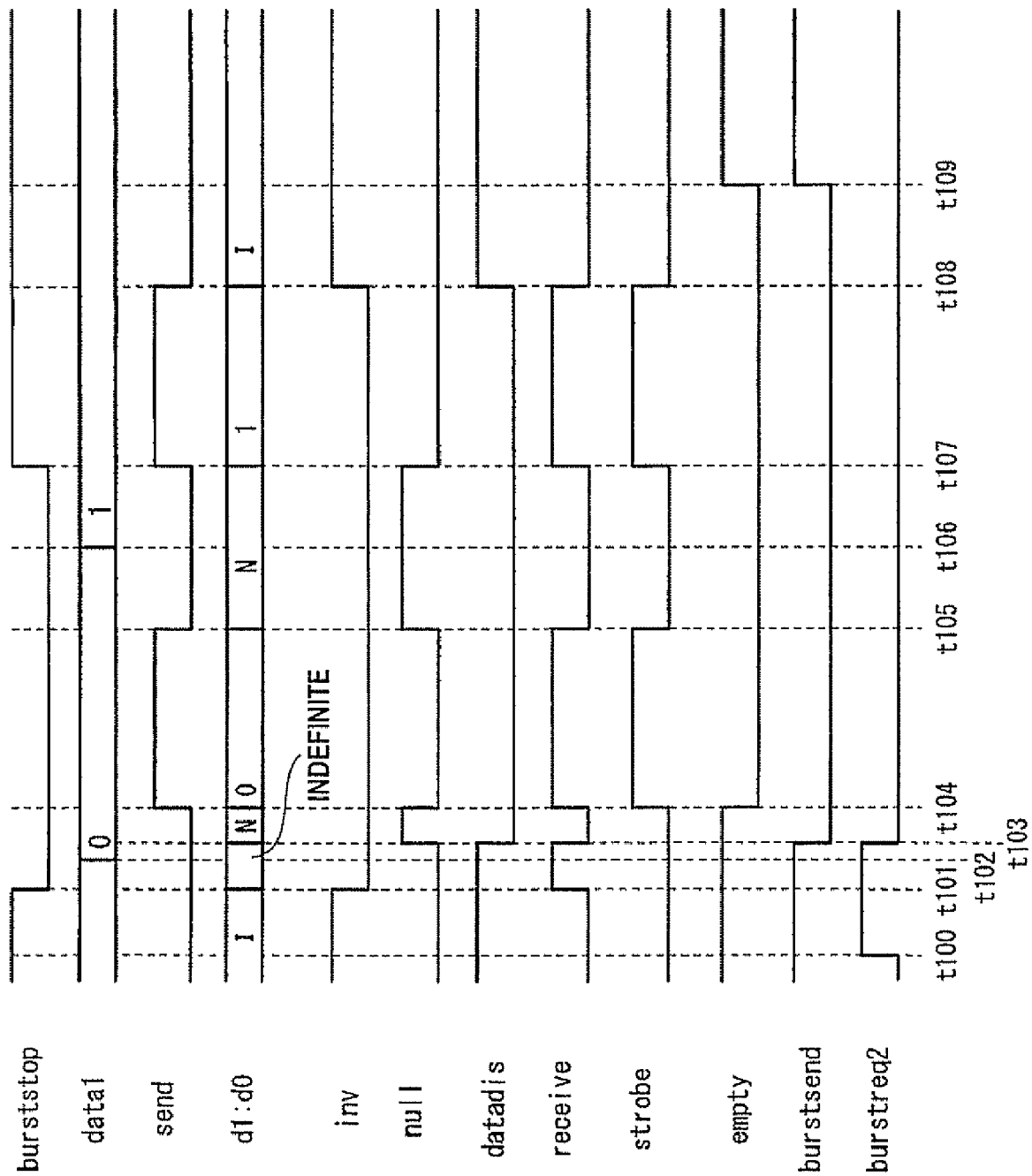
FIG. 10 is a timing chart showing operations of the high-bit-rate serial data transmission system according to the third embodiment.

Referring to FIG. 10, the operations of the transmitter 15 and the receiver 25 according to the third embodiment is described in detail below.

Only the different points between a combination of the active transmitter 15 and the passive receiver 25 in FIG. 10 and a combination of the passive transmitter 10 and the active receiver 20 in FIG. 5 are described.

The first different point is described in detail below.

At t101 in the timing chart, the burst request signal transmitting part 210 of the receiver 25 swings the burst request signal to H on "burstreq2" connecting to the transmitter 15.

At t101, the transmitter 15 sends out the burst request signal via "burstreq3" to the transmitting bus master on the transmitter control bus 30.

Then, in response to the burst request signal, the transmitting bus master swings the burst stop signal burststop to L.

The second difference is described in detail below.

At t103, in response to the burst end signal swung to L on "burstend", the receiving bus master swings the burst request signal to L on "burstreq1", and the burst request signal transmitting part 210 of the receiver 25 swings the burst request signal on "burstreq2" to L.

The other components and their operations in the third embodiment are the same as those in the first embodiment, and the description thereof is left out.

Fourth Embodiment

Serial-to-parallel Conversion Added to Third Embodiment

Figure 11:
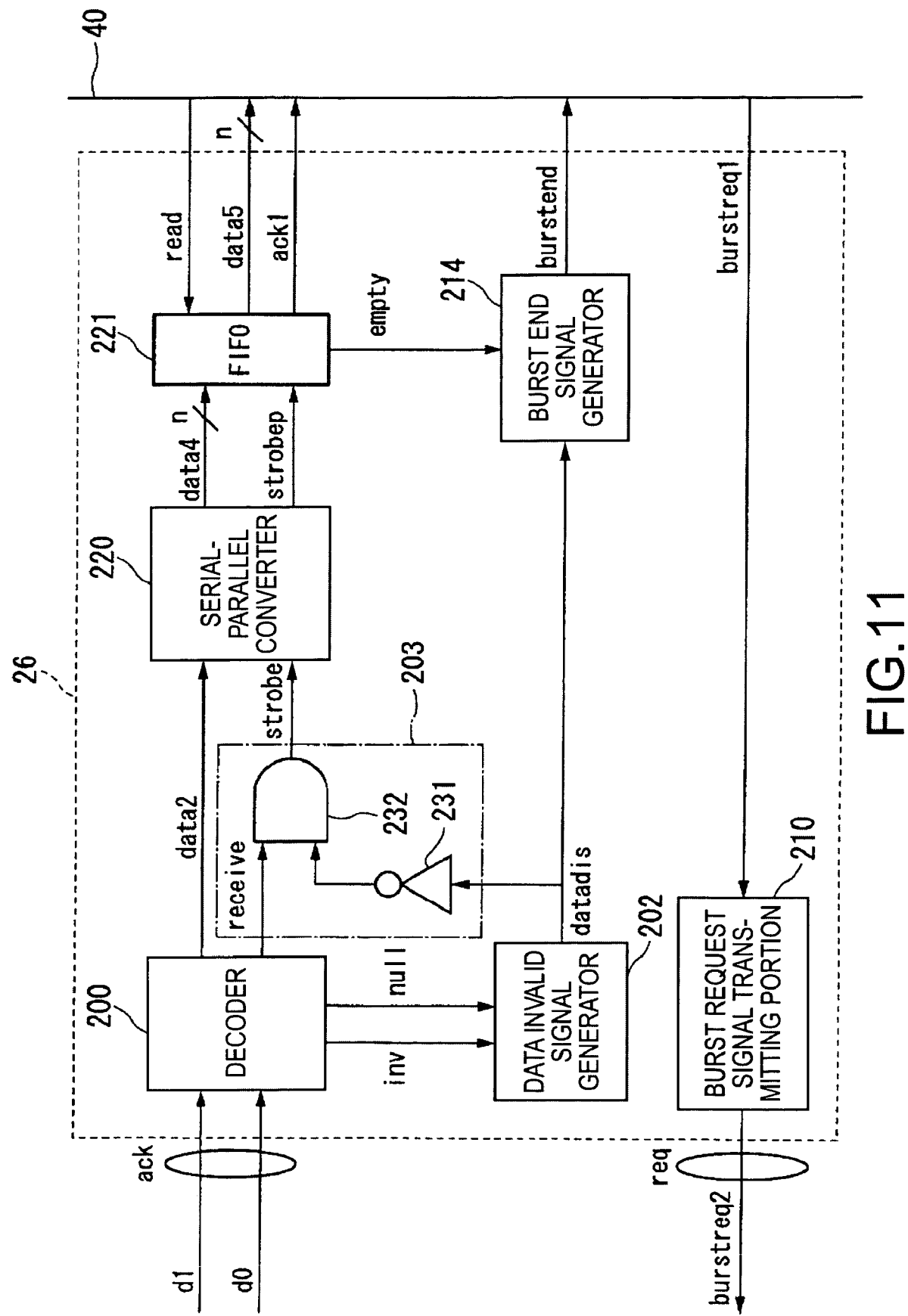
FIG. 11 is a schematic block diagram showing the configuration of the receiver according to the fourth embodiment.

Referring to FIG. 11, the configuration of a receiver 26 of a high-bit-rate serial data transmission system according to the fourth embodiment of the invention is described in detail below.

In the figure, parts corresponding to parts in FIGS. 9 and 6 are indexed by using the same numbers, and the description thereof is left out.

With similarity to the receiver 21 according to the second embodiment in FIG. 6, and with respect to the receiver 20 according to the first embodiment of FIG. 4, the serial-to-parallel converter 220 in the receiver 26 according to the fourth embodiment is added between the decoder 200 and the FIFO 201 in the receiver 2 of the third embodiment shown in FIG. 9.

In the receiver 26 according to the fourth embodiment in FIG. 11, the FIFO 221 replaces the FIFO 201 of the third embodiment shown in FIG. 9.

Accordingly, with the same different point between the high-bit-rate serial data transmission system according to the first embodiment and the high-bit-rate serial data transmission system according to the second embodiment, the receiver 26 according to the fourth embodiment can handle the n-bit parallel data by using the serial-to-parallel converter 220 and the FIFO 221, and by outputting the n-bit parallel data via the receiver control bus 40 to the receiving bus master.

The other components and their operations in the fourth embodiment are the same as those in the third embodiment, and the description thereof is left out.

Note that in the description of the first through the fourth embodiments, it is assumed that the communication between the transmitter and the receiver is performed by using the four-phase handshaking protocol.

However, the communication might be performed by using the two-phase handshaking protocol.

In the description of the first through the fourth embodiments, only two bits of the burst serial transmission are used to simply explain the sequence of the communication between the transmitter and the receiver.

However, the number of bits of the parallel data is not limited to two, and is rather unbounded.

In the description of the first through the fourth embodiments, it is assumed that each of the data signal lines: d0 and d1 are metal lines.

However, the data signal lines: d0 and d1 might be replaced by optical fibers for performing the same communication.

In the case of using optical fibers for the data signal lines, the encoder 100 is designed to include a light emitter for each of the data signal lines: do and d1 that outputs optical signals corresponding to the symbols: a null symbol (symbol N), an invalid symbol (symbol I), and data symbols representing the bit of data: 1 and 0, via the optical fibers, and the decoder 200 is designed to include a light receiver for each of the data signal lines: d0 and d1 that receives the optical signals of the symbols via the optical fibers.

The light emitter might be able to modulate the optical signals by using a high-frequency wave in accordance with the data symbols, and in the case, the light receiver demodulates the high-frequency optical wave and then decodes the data in accordance with the symbols.

In such a way as described above, the high-bit-rate serial data transmission systems according to the first through the fourth embodiments can be robust against the electromagnetic noise from the environment.

The high-bit-rate serial data transmission systems according to the first through the fourth embodiments might be fabricated on a silicon substrate.

The circuit of the semiconductor device fabricated on a silicon substrate can perform the high-bit-rate serial data transmission.

The high-bit-rate serial data transmission systems according to the first through the fourth embodiments can be fabricated on a plurality of silicon substrates constituting a hybrid semiconductor device.

This enables circuit blocks in a hybrid semiconductor device consisting of a plurality of silicon substrates to communicate with each other by using the high-bit-rate serial data transmission system hereof.

Such a transmitter as the transmitter 10 or 15 and such a receiver as the receiver 20, 21, 25 or 26 might be realized by using the dedicated circuit, and also by using a microprocessor and the peripheral circuits including memory devices.

In the latter case above, each program of the function of the transmitter and the function of receiver is stored into the memory and is executed by the microprocessor.

Hereinabove, the embodiments of this invention have been described in detail with reference to the accompanying drawings.

However, any other configurations and circuit designs not described here in the embodiments could be allowed as far as the scope of this invention is maintained.

The high-bit-rate serial data transmission system according to the embodiments of the invention is suited for communication devices connecting various manufacturing devices in factories.

The high-bit-rate serial data transmission system according to the embodiments of the invention is also suited for communication devices in semiconductor devices operating at high bit-rate with low power consumption that can be bendable when such a flexible substrate as plastic films is used.

What is claimed is:

1. A transmitter for use in a variable-length serial burst data transmission system having the transmitter and a receiver, the transmitter and the receiver being connected by at least two data transmission lines and a burst start line, the transmitter comprising:
 a dual-rail encoder that during transmitting variable-length serial transmit data made up of binary digits, encodes the transmit data into transmit data symbols, the transmit data symbols each associated with each piece of transmit data in advance, inserts an identification symbol for identifying the transmit data symbols from one another between the transmit data symbols to produce inserted transmit data, encodes the inserted transmit data to produce encoded transmit data, and transmits the encoded transmit data via the two data transmission lines to the receiver, and during non-transmit, transmits a non-transmit symbol representing a non-transmit state via the two data transmission lines to the receiver; and
 a burst start signal receiving part that receives a burst start signal via the burst start line from the receiver, the burst start signal indicating a start of burst transmission of the variable-length serial transmit data;
 wherein the dual-rail encoder transmits the identification symbol to the receiver at the start of the burst transmission, and performs the burst transmission of the variable-length serial transmit data in response to the burst request signal receiving part receiving the burst start signal from the receiver in accordance with the transmitted identification symbol.

2. A transmitter for use in a variable-length serial burst data transmission system having the transmitter and a receiver, the transmitter and the receiver being connected by at least two data transmission lines and a burst request line, the transmitter comprising:
 a burst request signal receiving part that receives a burst request signal via the burst request line from the receiver, the burst request signal being a signal indicating a request for burst transmission of variable-length serial transmit data; and
 a dual-rail encoder that, responding to the burst request signal receiving part receiving the burst request signal, during transmitting variable-length serial transmit data made up of binary digits, encodes the transmit data into transmit data symbols, the transmit data symbols each associated with each piece of transmit data in advance, inserts an identification symbol for identifying the transmit data symbols from one another between the transmit data symbols to produce inserted transmit data, encodes the inserted transmit data to produce encoded transmit data, and transmits the encoded transmit data via the two data transmission lines to the receiver, and during non-transmit, transmits a non-transmit symbol representing a non-transmit state via the two data transmission lines to the receiver.

3. A receiver for use in a variable-length serial burst data transmission system having a transmitter and the receiver, the transmitter and the receiver being connected by at least two data transmission lines and a burst start line, the receiver comprising:
 a storage that has received data stored therein and outputs a data empty signal if being free of data stored;
 a dual-rail decoder that receives variable-length serial transmit data from the transmitter, the variable-length serial transmit data being such that, during transmitting the variable-length serial transmit data made up of binary digits, the transmit data is encoded into transmit data symbols, the transmit data symbols each associated with each piece of transmit data in advance, an identification symbol for identifying the transmit data symbols from one another is inserted between the transmit data symbols to produce inserted transmit data, the inserted transmit data is encoded to produce encoded transmit data, and the encoded transmit data is transmitted via the two data transmission lines to the receiver, although during non-transmit, a non-transmit symbol representing a non-transmit state is transmitted via the two data transmission lines to the receiver, that outputs an identification symbol signal if the identification symbol included in the received variable-length serial transmit data is decoded and outputs a non-transmit symbol signal if the non-transmit symbol included in the received variable-length serial transmit data is decoded, and that decodes the transmit data symbols resulting from encoding based on the identification symbol included in the received variable-length serial transmit data and stores the decoded transmit data symbols as the received data in the storage;
 a data invalid signal generator to which the non-transmit symbol signal and the identification symbol signal are input from the dual-rail decoder, and that generates a data invalid signal from an input of the non-transmit symbol signal to an input of the identification symbol signal, the data invalid signal indicating that the received data is free from being stored into the storage;
 a burst start signal generator to which the data invalid signal and the data empty signal are input, and that generates a burst start signal if both the data invalid signal and the data empty signal are input, the burst start signal being a signal indicating start of the burst transmission of the variable-length serial transmit data; and
 a burst start signal transmitting part that transmits to the transmitter the burst start signal generated by the burst start signal generator.

4. The receiver according to claim 3, wherein:
the dual-rail decoder outputs the received data to the storage and transmits, during output of the received data to the storage, a write signal to the storage to cause the received data to be stored into the storage;

the receiver includes a strobe signal generator to which the write signal output by the dual-rail decoder is input and that outputs the input write signal to the storage; and the strobe signal generator masks the write signal, responding to the data invalid signal being input from the data invalid signal generator.

5. The receiver according to claim 3, wherein:

the dual-rail decoder outputs the received data; and the transmitter includes a serial-to-parallel converter that converts the received data output parallel by the dual-rail decoder by a predetermined number of bits and causes the received data converted parallel to be stored into the storage.

6. A receiver for use in a variable-length serial burst data transmission system having a transmitter and the receiver, the transmitter and the receiver being connected by at least two data transmission lines and a burst request line, the receiver comprising:

a storage that has received data stored therein and outputs a data empty signal if being free of data stored;

a burst request signal transmitting part that transmits a burst request signal via the burst request line to the transmitter, the burst request signal being a signal that indicates a request for burst transmission of variable-length serial transmit data;

a dual-rail decoder that, responding to the transmitter receiving the burst request signal, receives variable-length serial transmit data from the transmitter, the variable-length serial transmit data being such that, during transmitting the variable-length serial transmit data made up of binary digits, the transmit data is encoded into transmit data symbols, the transmit data symbols each associated with each piece of transmit data in advance, the transmit data symbols having an identification symbol for identifying the transmit data symbols from one another inserted therebetween producing inserted transmit data, the inserted transmit data encoded to produce encoded transmit data, the encoded transmit data transmitted via the two data transmission lines to the receiver, although during non-transmit, a non-transmit symbol representing a non-transmit state is transmitted via the two data transmission lines to the receiver, that outputs an identification symbol signal if the identification symbol included in the received variable-length serial transmit data is decoded and outputs a non-transmit symbol signal if the non-transmit symbol included in the received variable-length serial transmit data is decoded, and that decodes the transmit data symbols resulting from encoding based on the identification symbol included in the received variable-length serial transmit data and stores the decoded transmit data symbols as the received data in the storage;

a data invalid signal generator to which the non-transmit symbol signal and the identification symbol signal are input from the dual-rail decoder, and that generates a data invalid signal from input of the non-transmit symbol signal to input of the identification symbol signal, the data invalid signal indicating that the received data is free from being stored into the storage; and a burst end signal generator to which the data invalid signal and the data empty signal are input, and that generates and outputs a burst start signal if both the data invalid signal and the data empty signal are input, the burst end signal indicating end of receiving the variable-length serial transmit data.

7. A transmitting method of a transmitter for use in a variable-length serial burst data transmission system having the transmitter and a receiver, the transmitter and the receiver being connected by at least two data transmission lines and a burst start line, the transmitting method comprising:

during transmitting variable-length serial transmit data made up of binary digits, encoding the transmit data into transmit data symbols, the transmit data symbols each associated with each piece of transmit data in advance, inserting an identification symbol for identifying the transmit data symbols from one another between the transmit data symbols resulting from encoding to encode the transmit data, and transmitting the encoded transmit data via the two data transmission lines to the receiver, and during non-transmit, transmitting a non-transmit symbol representing a non-transmit state via the two data transmission lines to the receiver;

receiving a burst start signal via the burst start line from the receiver, the burst start signal indicating start of burst transmission of the variable-length serial transmit data; and transmitting the identification symbol to the receiver at the start of the burst transmission, and performing the burst transmission of the variable-length serial transmit data in response to the burst request signal receiving part receiving the burst start signal from the receiver in accordance with the transmitted identification symbol.

8. A transmitting method of a transmitter for use in a variable-length serial burst data transmission system having the transmitter and a receiver, the transmitter and the receiver being connected by at least two data transmission lines and a burst request line, the transmitting method comprising:

receiving a burst request signal via the burst request line from the receiver, the burst request signal being a signal that indicates a request for burst transmission of variable-length serial transmit data; and in response to the burst request signal receiving part receiving the burst start signal, during transmitting variable-length serial transmit data made up of binary digits, encoding the transmit data into transmit data symbols, the transmit data symbols each associated with each piece of transmit data in advance, inserting an identification symbol for identifying the transmit data symbols from one another between the transmit data symbols resulting from encoding to encode the transmit data, and transmitting the encoded transmit data via the two data transmission lines to the receiver, and during non-transmit, transmitting a non-transmit symbol representing a non-transmit state via the two data transmission lines to the receiver.

9. A receiving method of a receiver for use in a variable-length serial burst data transmission system having a transmitter and the receiver, the transmitter and the receiver being connected by at least two data transmission lines and a burst start line, the receiving method comprising:

receiving variable-length serial transmit data from the transmitter, the variable-length serial transmit data being such that, during transmitting the variable-length serial transmit data made up of binary digits, the transmit data is encoded into transmit data symbols, the transmit data symbols each associated with each piece of transmit data in advance, an identification symbol for identifying the transmit data symbols from one another is inserted between the transmit data symbols to produce inserted transmit data, the inserted transmit data is encoded to produce encoded transmit data, and the encoded transmit data transmitted via the two data transmission lines to the receiver, although during non-transmit, a non-transmit symbol representing a non-transmit state is transmitted via the two data transmission lines to the receiver, outputting an identification symbol signal if the identification symbol included in the received variable-length serial transmit data is decoded and outputting a non-transmit symbol signal if the non-transmit symbol included in the received variable-length serial transmit data is decoded, and decoding the transmit data symbols resulting from encoding based on the identification symbol included in the received variable-length serial transmit data and storing the decoded transmit data symbols as the received data in a storage;

outputting a data empty signal if the storage is free of data stored therein;

receiving input of the non-transmit symbol signal and the identification symbol signal, and generating a data invalid signal from input of the non-transmit symbol signal to input of the identification symbol signal, the data invalid signal indicating that the received data is free from being stored into the storage;

receiving input of the data invalid signal and the data empty signal, and generating a burst start signal if both the data invalid signal and the data empty signal are input; and transmitting the generated burst start signal to the transmitter.

10. The receiving method according to claim 9, wherein the receiver outputs the received data to the storage and transmits, during output of the received data to the storage, a write signal to the storage to cause the received data to be stored into the storage, and masks the write signal in response to the data invalid signal being input.

11. The receiving method according to claim 9, wherein the receiver converts the received data parallel by a predetermined number of bits and causes the received data converted parallel to be stored into the storage.

12. A receiving method of a receiver for use in a variable-length serial burst data transmission system having a transmitter and the receiver, the transmitter and the receiver being connected by at least two data transmission lines and a burst request line, the receiving method comprising:

transmitting a burst request signal via the burst request line to the transmitter, the burst request signal being a signal that indicating a request for burst transmission of variable-length serial transmit data;

receiving, in response to the transmitter receiving the burst request signal, variable-length serial transmit data from the transmitter, the variable-length serial transmit data being such that, during transmitting the variable-length serial transmit data made up of binary digits, the transmit data is encoded into transmit data symbols, the transmit data symbols each associated with each piece of transmit data in advance, an identification symbol for identifying the transmit data symbols from one another is inserted between the transmit data symbols to produce inserted transmit data, the inserted transmit data is encoded to produce encoded transmit data, and the encoded transmit data is transmitted via the two data transmission lines to the receiver, although during non-transmit, a non-transmit symbol representing a non-transmit state is transmitted via the two data transmission lines to the receiver, outputting an identification symbol signal if the identification symbol included in the received variable-length serial transmit data is decoded and outputting a non-transmit symbol signal if the non-transmit symbol included in the received variable-length serial transmit data is decoded, and decoding the transmit data symbols resulting from encoding based on the identification symbol included in the received variable-length serial transmit data and storing the decoded transmit data symbols as the received data in the storage;

outputting a data empty signal if the storage being free of data stored therein;

receiving input of the non-transmit symbol signal and the identification symbol signal, and generating a data invalid signal from input of the non-transmit symbol signal to input of the identification symbol signal, the data invalid signal indicating that the received data is free from being stored into the storage; and receiving input of the data invalid signal the data empty signal, and generating and outputting a burst start signal if both the data invalid signal and the data empty signal are input, the burst end signal indicating end of receiving the variable-length serial transmit data.

13. A variable-length serial burst data transmission system comprising a transmitter and a receiver, the transmitter and the receiver being connected by at least two data transmission lines and a burst start line, the transmitter including:

a dual-rail encoder that during transmitting variable-length serial transmit data made up of binary digits, encodes the transmit data into transmit data symbols, the transmit data symbols each associated with each piece of transmit data in advance, inserts an identification symbol for identifying the transmit data symbols from one another between the transmit data symbols to produce inserted transmit data, encodes the inserted transmit data to produce encoded transmit data and transmits the encoded transmit data via the two data transmission lines to the receiver, and during non-transmit, transmits a non-transmit symbol representing a non-transmit state via the two data transmission lines to the receiver; and a burst start signal receiving part that receives a burst start signal via the burst start line from the receiver, the burst start signal being a signal that indicates start of burst transmission of the variable-length serial transmit data, wherein the dual-rail encoder transmits the identification symbol to the receiver at the start of the burst transmission, and performs the burst transmission of the variable-length serial transmit data in response to the burst request signal receiving part receiving the burst start signal from the receiver in accordance with the transmitted identification symbol;

the receiver including:

a storage that has received data stored therein and outputs a data empty signal if being free of data stored;

a dual-rail decoder that receives the encoded variable-length serial transmit data from the transmitter, that outputs an identification symbol signal if the identification symbol included in the received variable-length serial transmit data is decoded and outputs a non-transmit symbol signal if the non-transmit symbol included in the received variable-length serial transmit data is decoded, and that decodes the transmit data symbols resulting from encoding based on the identification symbol included in the received variable-length serial transmit data and stores the decoded transmit data symbols as the received data in the storage;

a data invalid signal generator to which the non-transmit symbol signal and the identification symbol signal are input from the dual-rail decoder, and that generates a data invalid signal from input of the non-transmit symbol signal to input of the identification symbol signal, the data invalid signal indicating that the received data is free from being stored into the storage;

a burst start signal generator to which the data invalid signal and the data empty signal are input, and that generates a burst start signal if both the data invalid signal and the data empty signal are input; and a burst start signal transmitting part that transmits to the transmitter the burst start signal generated by the burst start signal generator.

14. The variable-length serial burst data transmission system according to claim 13, wherein the data transmission lines are each a metal line.

15. The variable-length serial burst data transmission system according to claim 13, wherein:

the data transmission lines are each an optical fiber;

the dual-rail encoder includes a light emitter that outputs a transmit symbol via the optical fiber, the transmit symbol being a transmit data symbol, an identification symbol or a non-transmit symbol; and the dual-rail decoder includes a light receiver that receives the transmit symbol via the optical fiber.

16. The variable-length serial burst data transmission system according to claim 15, wherein:

the light emitter modulates an optical output with high frequency in accordance with the transmit symbol; and the light receiver receives high-frequency light modulated in accordance with the transmit symbol and decodes the data.

17. A semiconductor device having the variable-length serial burst data transmission system according to claim 13 formed on one silicon substrate.

18. A hybrid semiconductor device having the variable-length serial burst data transmission system according to claim 13 formed on a plurality of different silicon substrates.

19. A variable-length serial burst data transmission system comprising a transmitter and a receiver, the transmitter and the receiver being connected by at least two data transmission lines and a burst request line, the receiver including:

a burst request signal transmitting part that transmits a burst request signal via the burst request line to the transmitter, the burst request signal being a signal that indicates a request for burst transmission of variable-length serial transmit data;

the transmitter including:

a burst request signal receiving part that receives the burst request signal via the burst request line from the receiver; and a dual-rail encoder that, responding to the burst request signal receiving part receiving the burst start signal, during transmitting variable-length serial transmit data made up of binary digits, encodes the transmit data into transmit data symbols, the transmit data symbols each associated with each piece of transmit data in advance, inserts an identification symbol for identifying the transmit data symbols from one another between the transmit data symbols to produce inserted transmit data, encodes the inserted transmit data to produce encoded transmit data, and transmits the encoded transmit data via the two data transmission lines to the receiver, and during non-transmit, transmits a non-transmit symbol representing a non-transmit state via the two data transmission lines to the receiver;

the receiver including:

a storage that has received data stored therein and outputs a data empty signal if being free of data stored;

a dual-rail decoder that receives the encoded variable-length serial transmit data from the transmitter, that outputs an identification symbol signal if the identification symbol included in the received variable-length serial transmit data is decoded and outputs a non-transmit symbol signal if the non-transmit symbol included in the received variable-length serial transmit data is decoded, and that decodes the transmit data symbols resulting from encoding based on the identification symbol included in the received variable-length serial transmit data and stores the decoded transmit data symbols as the received data in the storage;

a data invalid signal generator to which the non-transmit symbol signal and the identification symbol signal are input from the dual-rail decoder, and that generates a data invalid signal from input of the non-transmit symbol signal to input of the identification symbol signal, the data invalid signal indicating that the received data is free from being stored into the storage; and a burst end signal generator to which the data invalid signal and the data empty signal are input, and that generates and outputs a burst start signal if both the data invalid signal and the data empty signal are input, the burst end signal indicating end of receiving the variable-length serial transmit data.

* * * * *

UNITED STATES PATENT AND TRADEMARK OFFICE
CERTIFICATE OF CORRECTION

| | | |
|---|---|---|
| PATENT NO. | : 8,175,171 B2 | |
| APPLICATION NO. | : 12/113688 | |
| DATED | : May 8, 2012 | |
| INVENTOR(S) | : Nobuo Karaki | |

It is certified that error appears in the above-identified patent and that said Letters Patent is hereby corrected as shown below:

On the cover of the Letters Patent please change INID field (45) as follows:

(45) Date of Patent:    *May 8, 2012

On the Title Page:

The first or sole Notice should read --

Subject to any disclaimer, the term of this patent is extended or adjusted under 35 U.S.C. 154(b) by 1042 days.

This patent is subject to a terminal disclaimer.

Signed and Sealed this
Fourteenth Day of August, 2012

David J. Kappos
*Director of the United States Patent and Trademark Office*